US011222636B2

(12) United States Patent
Lee

(10) Patent No.: US 11,222,636 B2
(45) Date of Patent: Jan. 11, 2022

(54) INTELLIGENT VOICE RECOGNIZING METHOD, APPARATUS, AND INTELLIGENT COMPUTING DEVICE

(71) Applicant: LG ELECTRONICS INC., Seoul (KR)

(72) Inventor: Bongki Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 16/554,343

(22) Filed: Aug. 28, 2019

(65) Prior Publication Data

US 2019/0385608 A1  Dec. 19, 2019

(30) Foreign Application Priority Data

Aug. 12, 2019  (KR) ......................... 10-2019-0098374

(51) Int. Cl.
| | | |
|---|---|---|
| *G10L 15/22* | (2006.01) | |
| *G10L 15/30* | (2013.01) | |
| *G10L 15/10* | (2006.01) | |
| *G10L 15/16* | (2006.01) | |

(52) U.S. Cl.
CPC .............. *G10L 15/22* (2013.01); *G10L 15/10* (2013.01); *G10L 15/16* (2013.01); *G10L 15/30* (2013.01); *G10L 2015/223* (2013.01)

(58) Field of Classification Search
CPC ......... G10L 15/00; G10L 15/10; G10L 15/16; G10L 15/22; G10L 15/30; G10L 2015/223
See application file for complete search history.

(56) References Cited

U.S. PATENT DOCUMENTS

| 6,420,986 B1* | 7/2002 | Shahaf ................. H03M 1/183 341/139 |
|---|---|---|
| 6,810,273 B1* | 10/2004 | Mattila ............... G10L 21/0208 455/570 |
| 2009/0210227 A1* | 8/2009 | Sugiyama ............... G10L 15/22 704/246 |

(Continued)

FOREIGN PATENT DOCUMENTS

| JP | 2001-117585 A | 4/2001 |
|---|---|---|
| KR | 10-2019-0075870 A | 7/2019 |
| KR | 10-2019-0093528 A | 9/2019 |

*Primary Examiner* — Shaun Roberts
*Assistant Examiner* — Sean E Serraguard
(74) *Attorney, Agent, or Firm* — Birch, Stewart, Kolasch & Birch, LLP

(57) ABSTRACT

Provided are an intelligent voice recognition method, a voice recognition device and an intelligent computing device. In an intelligent voice recognition method, if a microphone detection signal is obtained after the size of a first voice signal is determined, the size of the microphone detection signal is adjusted based on the size of the first voice signal. A second voice signal is recognized in the adjusted microphone detection signal. Accordingly, a command included in a user's voice can be recognized accurately. At least one of the voice recognition device, the intelligent computing device and the server of the present invention may be associated with an Artificial Intelligence module, a drone (Unmanned Aerial Vehicle, UAV), robot, Augmented Reality (AR) device, virtual reality (VR) device and a device related to the 5G service.

10 Claims, 15 Drawing Sheets

(56) References Cited

U.S. PATENT DOCUMENTS

| | | | |
|---|---|---|---|
| 2009/0232320 A1* | 9/2009 | Azizi | G10L 21/0208 |
| | | | 381/57 |
| 2013/0138431 A1* | 5/2013 | Choi | G10L 19/008 |
| | | | 704/201 |
| 2016/0078884 A1* | 3/2016 | Sehlstedt | G10L 15/063 |
| | | | 704/233 |
| 2019/0348039 A1* | 11/2019 | Hsiung | G10L 25/78 |

* cited by examiner

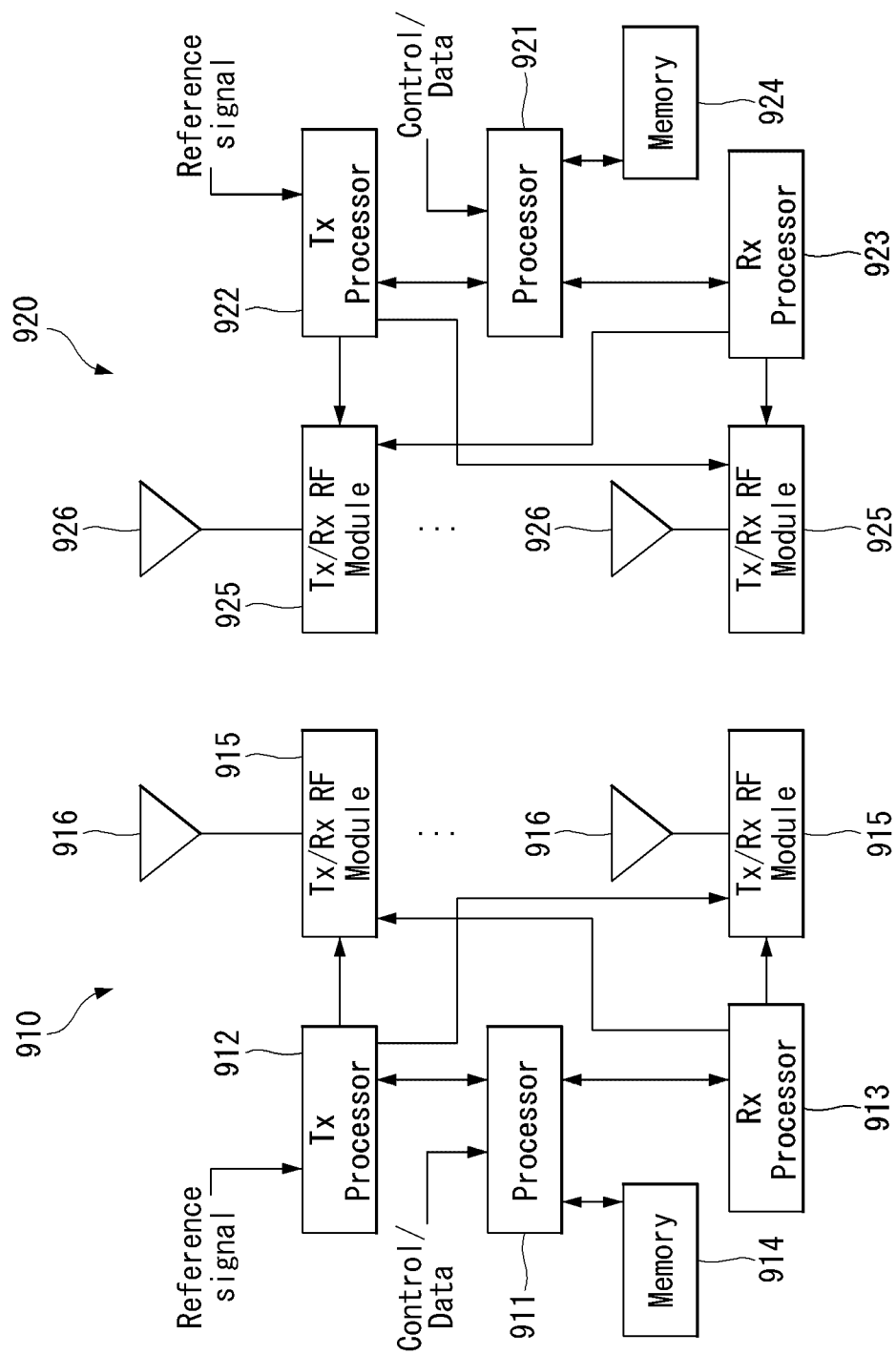
[FIG. 1]

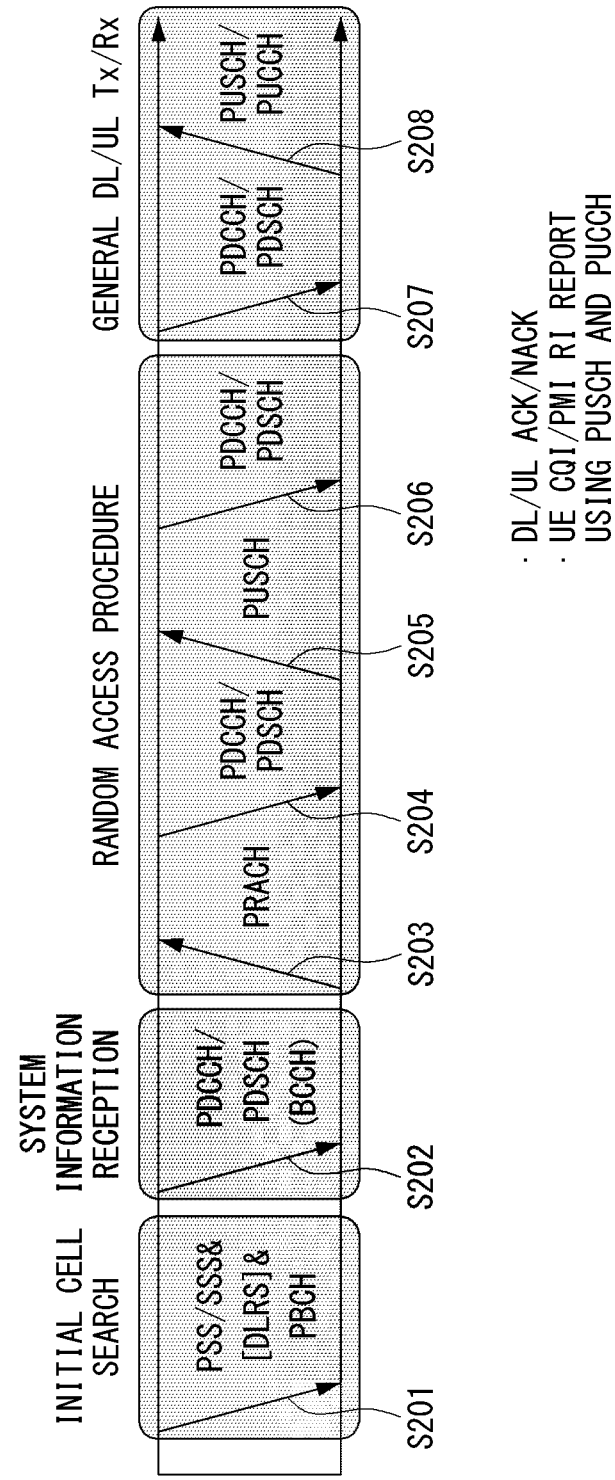
[FIG. 2]

[FIG. 3]
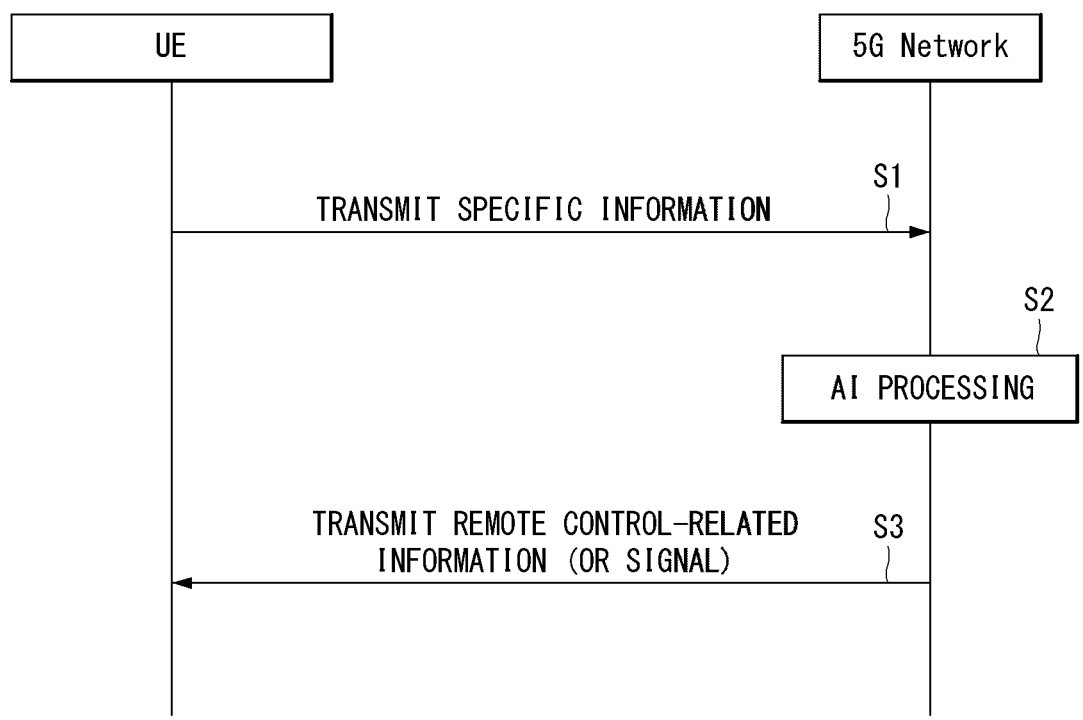

【FIG. 4】
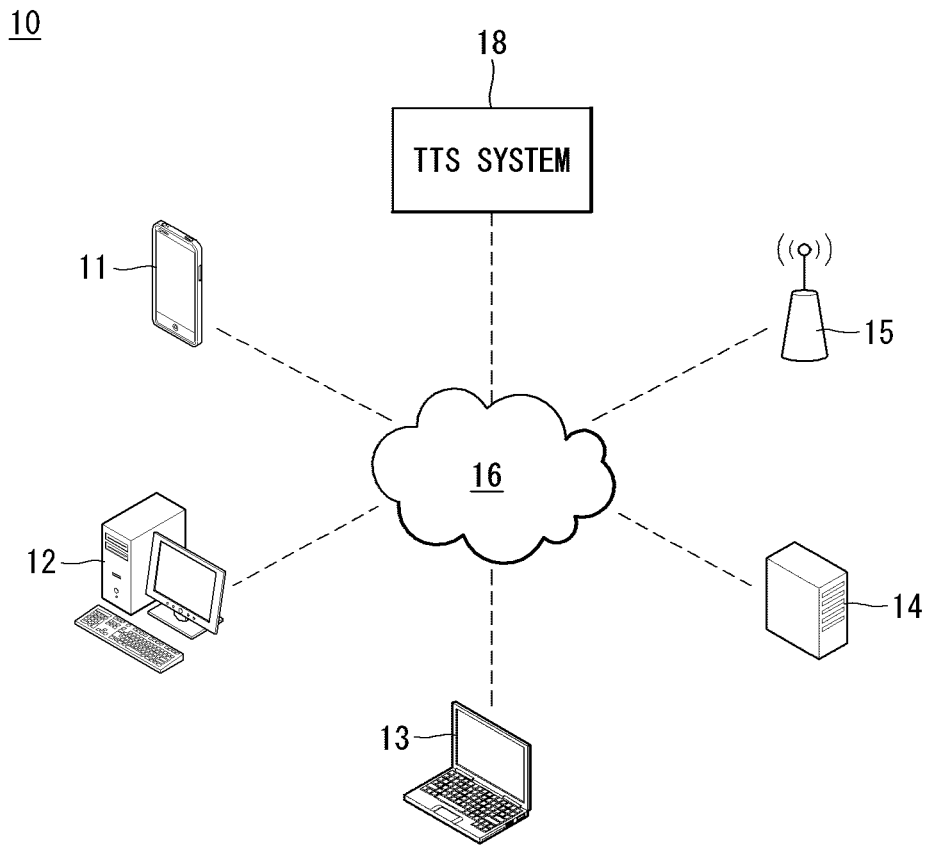
【FIG. 5】
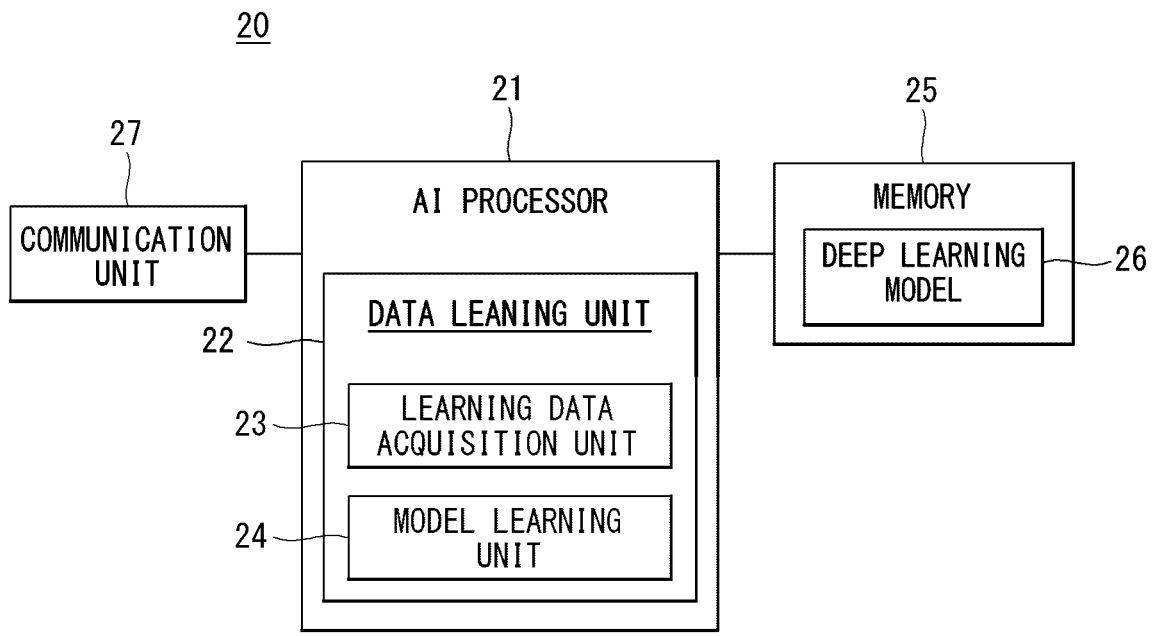

[FIG. 6]
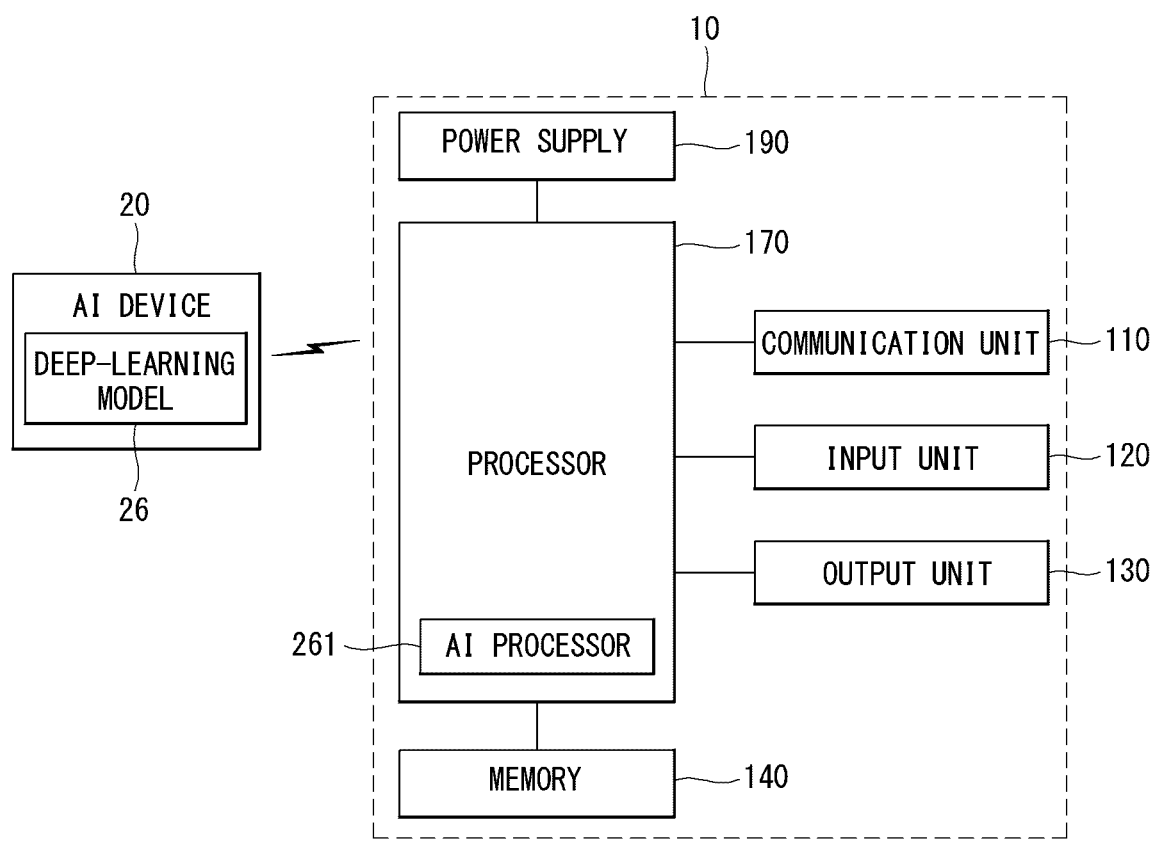

[FIG. 7]
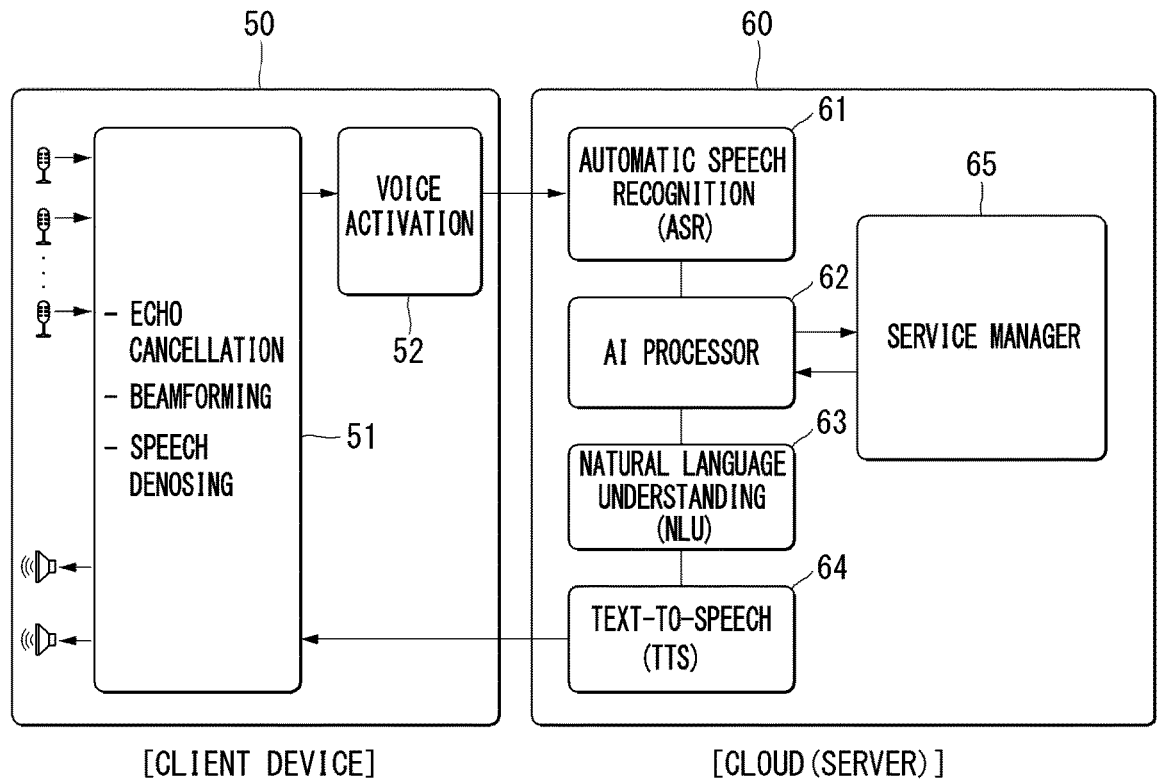
[FIG. 8]
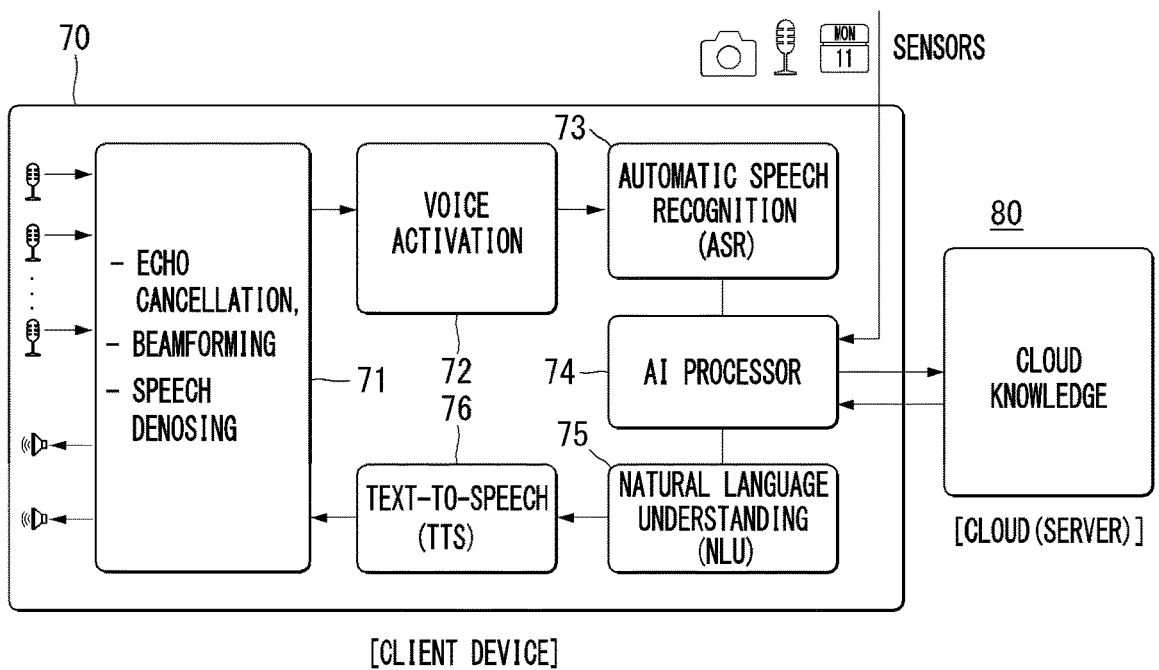

[FIG. 9]
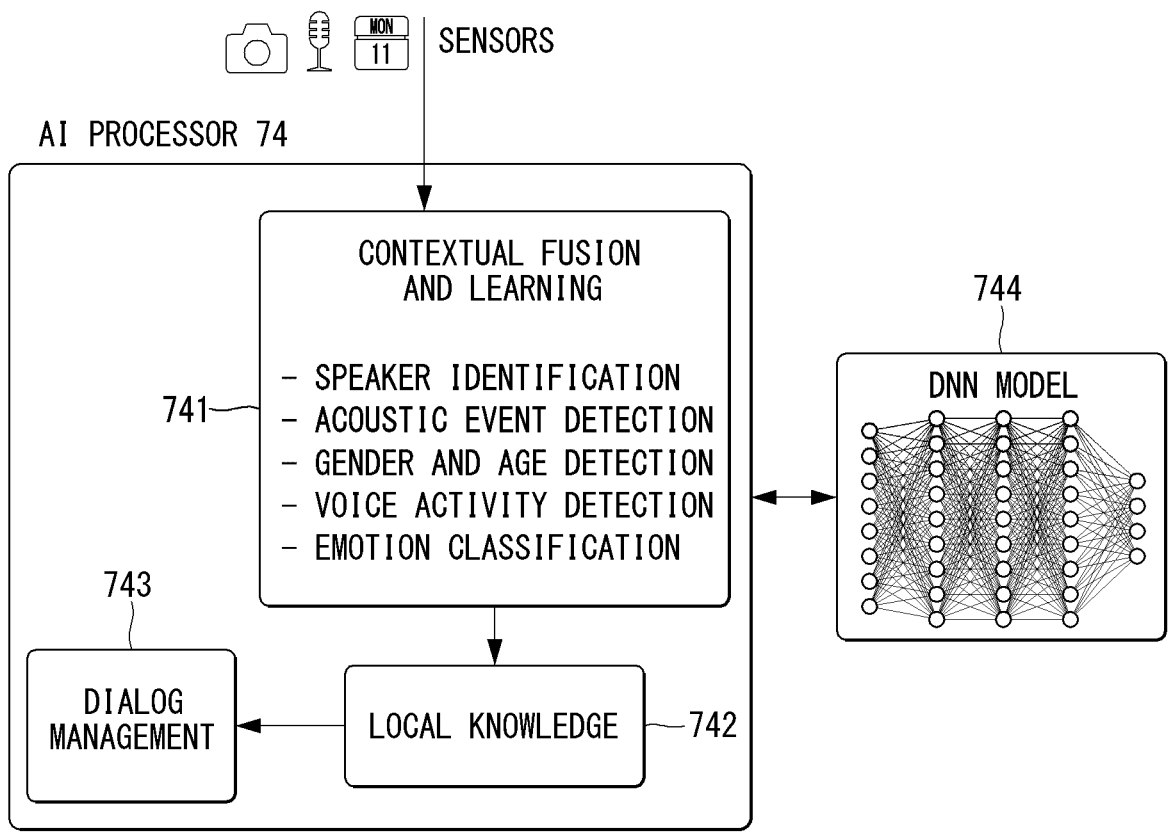

[FIG. 10]
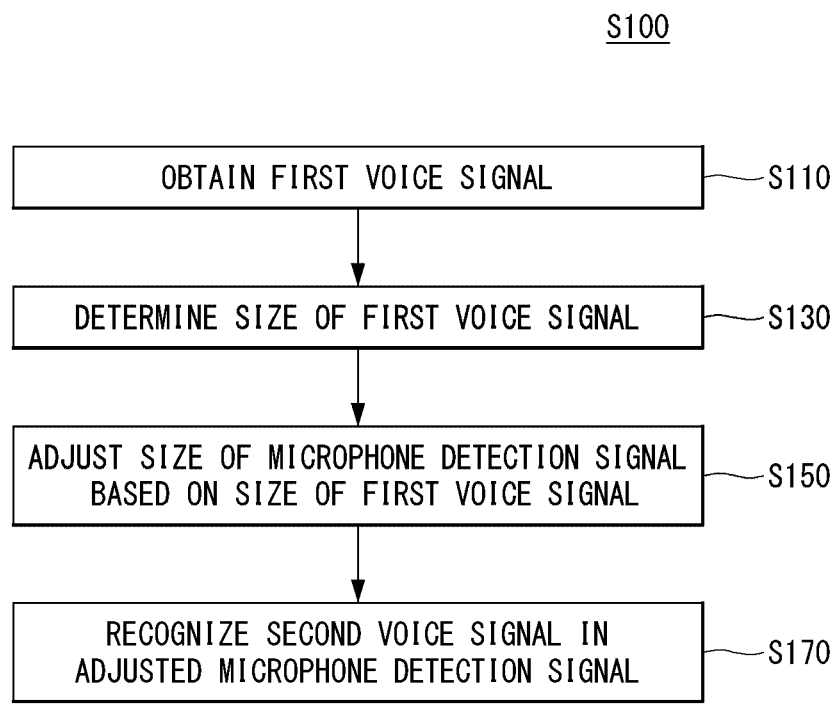

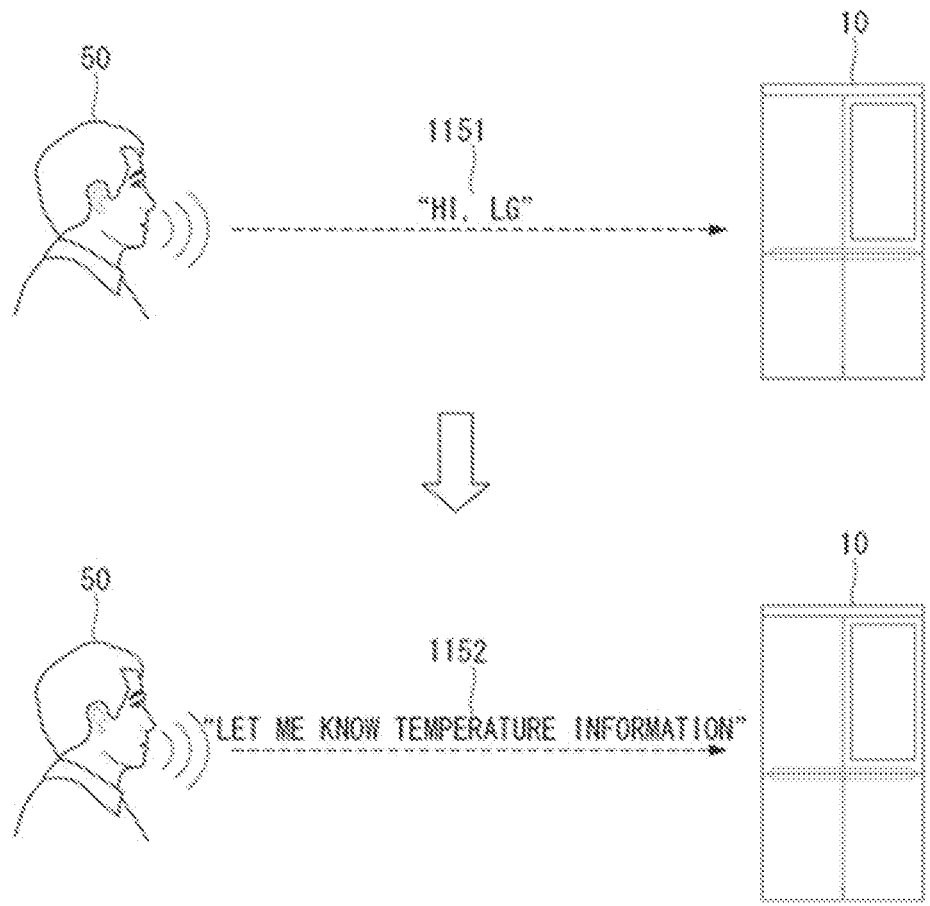
[FIG. 11]

[FIG. 12]
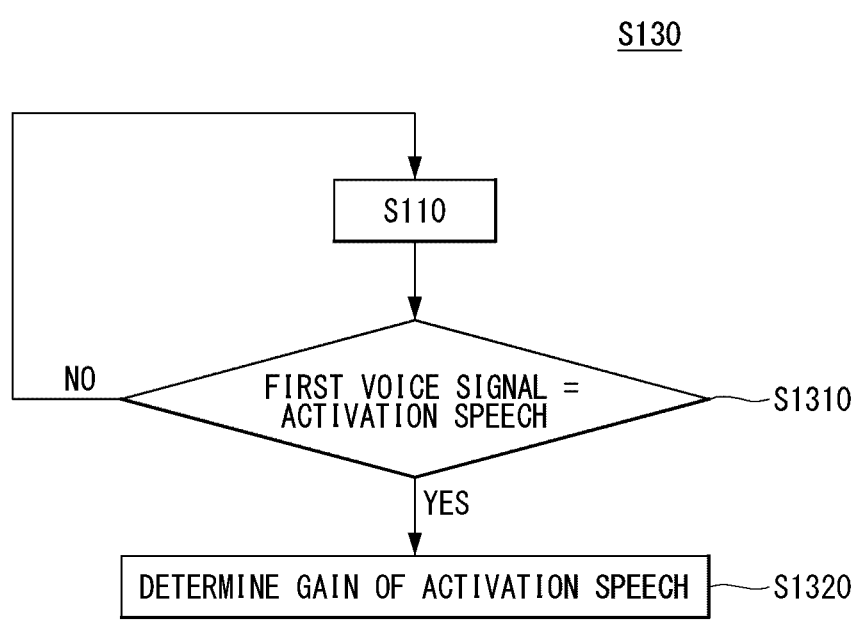

[FIG. 13]
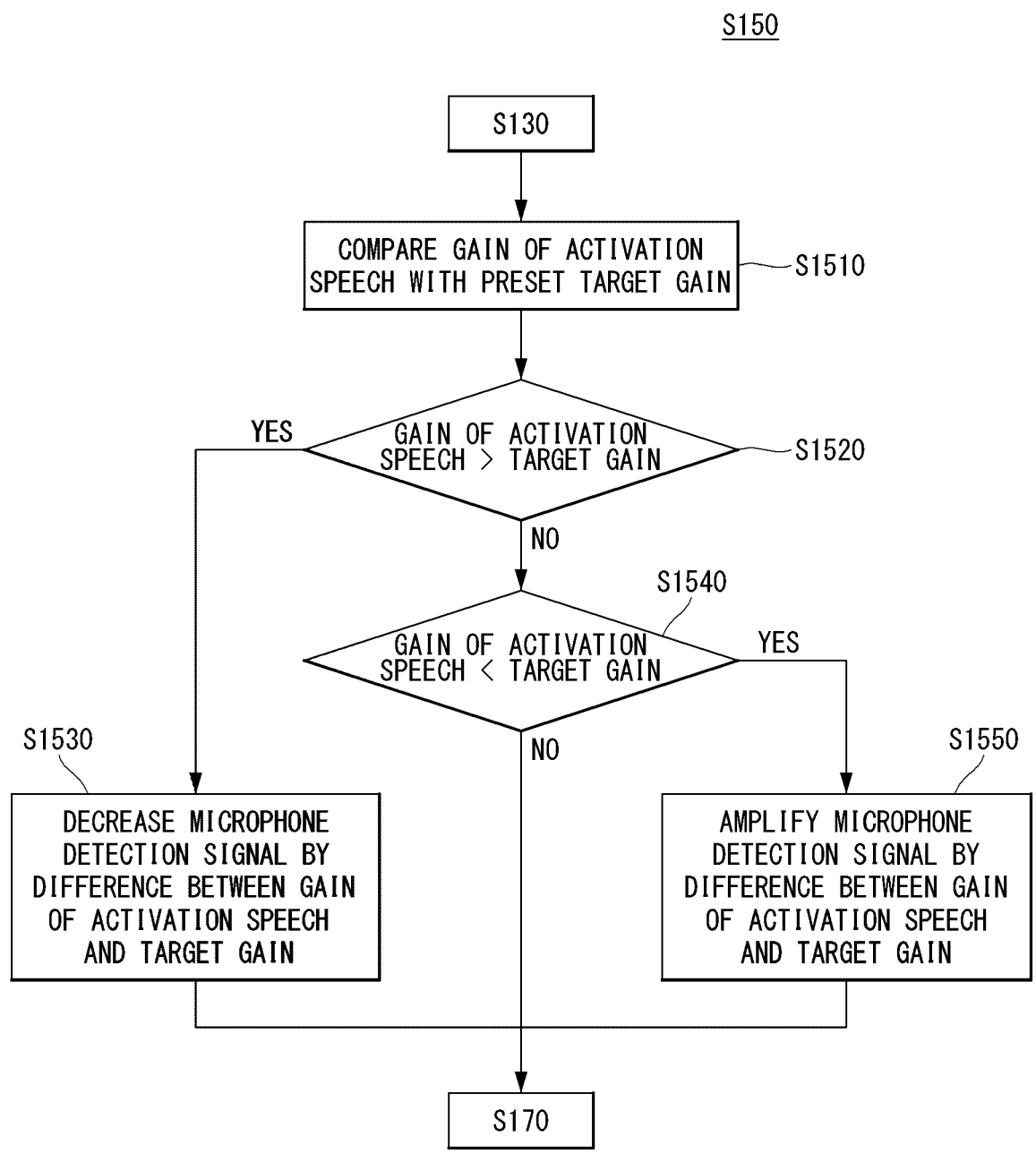

[FIG. 14]
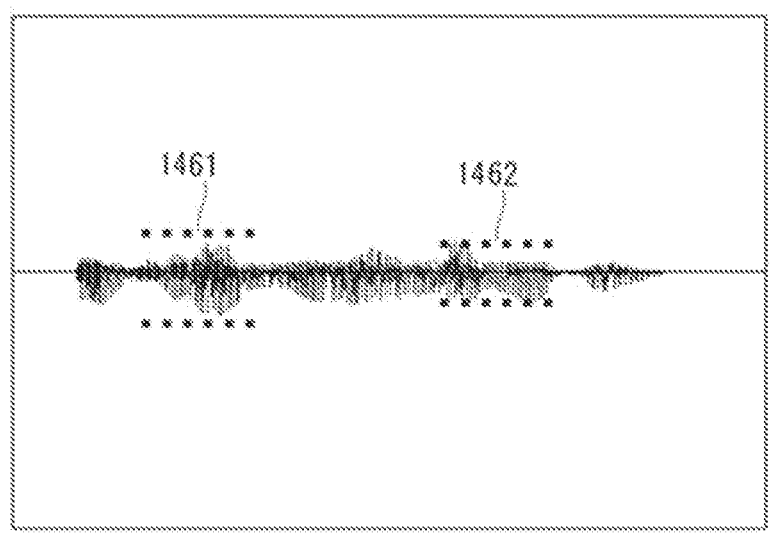

[FIG. 15]
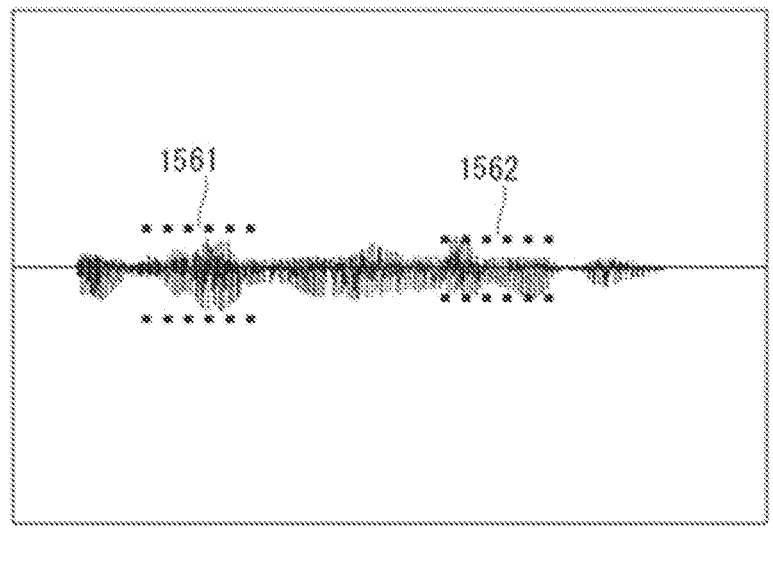
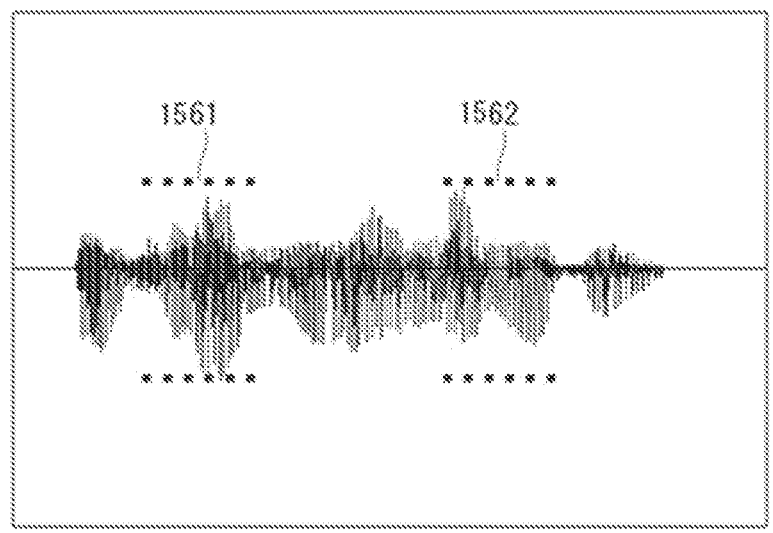

[FIG. 16]
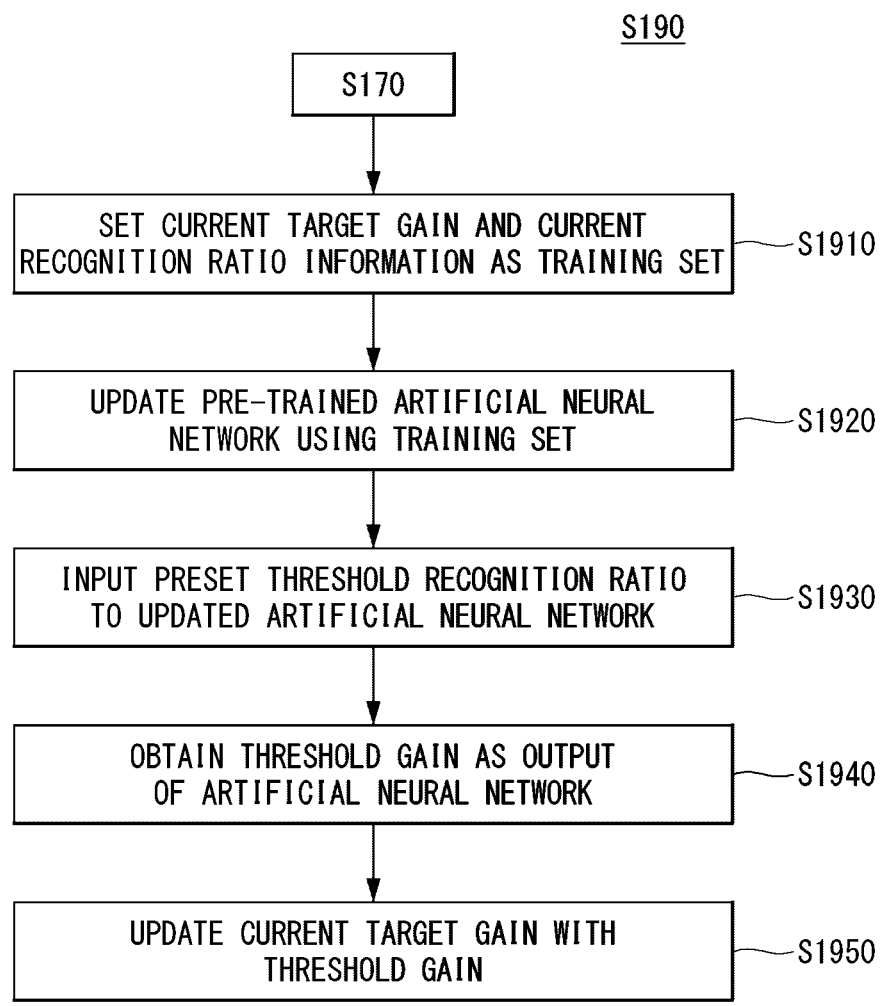

[FIG. 17]
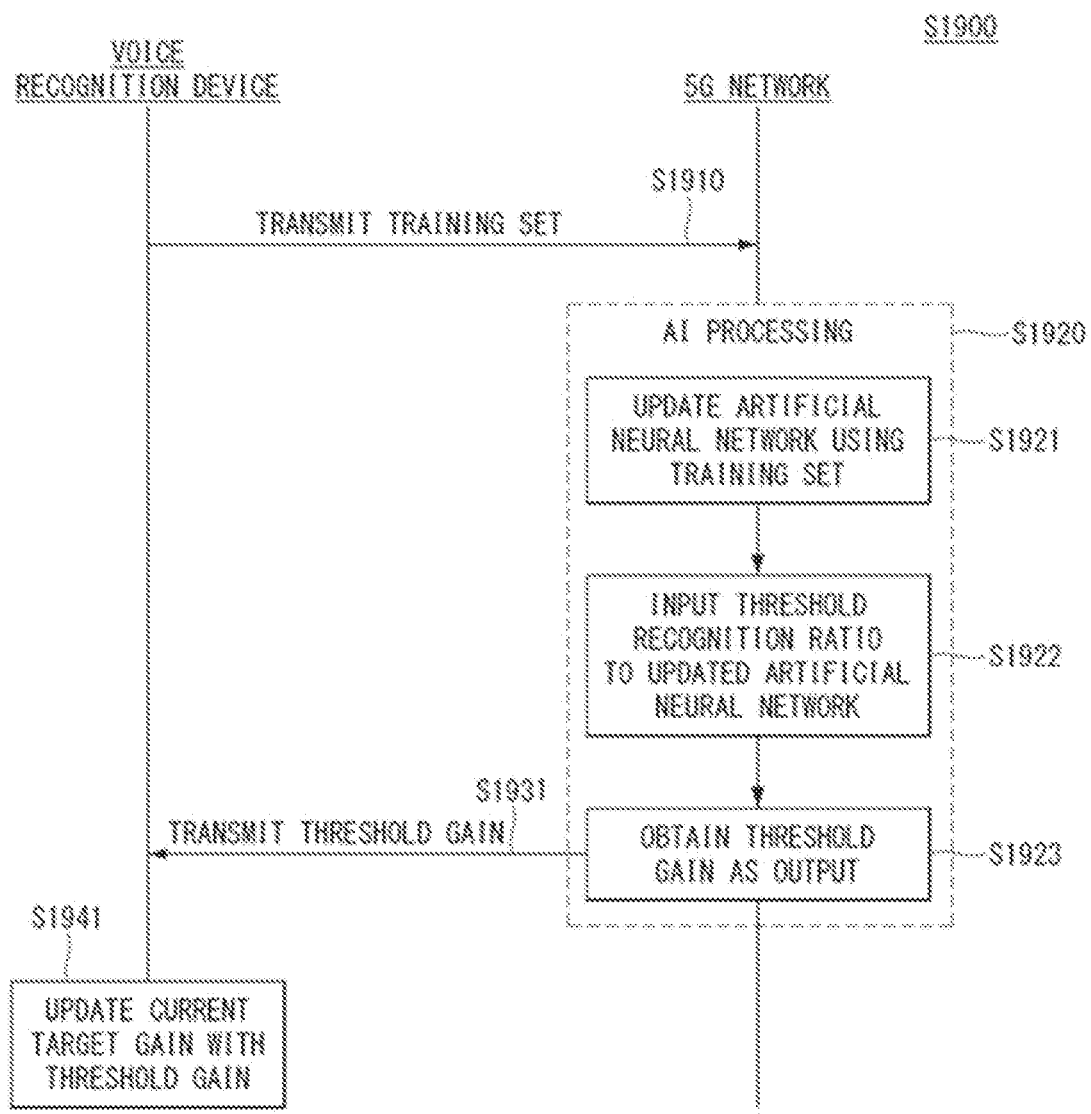

INTELLIGENT VOICE RECOGNIZING METHOD, APPARATUS, AND INTELLIGENT COMPUTING DEVICE

CROSS REFERENCE TO RELATED APPLICATIONS

This application is based on and claims priority under 35 U.S.C. § 119(a) to Korean Patent Application No. 10-2019-0098374 filed on Aug. 12, 2019 in the Korean Intellectual Property Office, the disclosure of which is incorporated herein by reference in its entirety.

BACKGROUND OF THE INVENTION

Field of the Invention

The present invention relates to an intelligent voice recognition method, a voice recognition device and an intelligent computing device and, more particularly, to an intelligent voice recognition method, a voice recognition device and an intelligent computing device for recognizing a user's voice.

Related Art

A voice output device can convert a user's voice into text, can analyze the meaning of a message included in the text, and can output a sound of a different form based on a result of the analysis.

Examples of the voice output device may include a home robot of a home IoT system and an artificial intelligence (AI) speaker using an artificial intelligence technique.

A conventional voice recognition device has a relatively high recognition ratio for a voice spoken from a relatively short distance (e.g., 1 meter or less), but may fail in voice recognition because it has a relatively small size of a microphone detection signal for a voice spoken from a relatively distant distance (e.g., 5 meters or more).

Furthermore, in the case of a voice spoken from a relatively short distance, a clipping phenomenon in which a signal exceeding a limit permitted by the voice recognition device is detected by a microphone may occur. Accordingly, there is a problem in that voice recognition performance of the voice recognition device is low.

A real-time automatic gain control (AGC) algorithm based on a voice probability is used as a conventional technology for overcoming the problem. The AGC algorithm operates in such a way as to significantly amplify or decrease a value of a microphone detection signal for each frame only when the signal is a voice.

In this case, an algorithm based on a voice probability, such as the AGC algorithm, may miscalculate a noise (e.g., a TV sound, conversation between plural speakers, or music) signal as a voice signal if the noise similar to a user's voice is mixed with a microphone detection signal. Accordingly, there is a disadvantage in that the signal to noise ratio (SNR) of the entire microphone detection signal is reduced because the noise signal is amplified.

SUMMARY OF THE INVENTION

An object of the present invention is to meet the needs and solve the problems.

Furthermore, the present invention implements an intelligent voice recognition method, a voice recognition device and an intelligent computing device for accurately recognizing a user's voice in a microphone detection signal.

Furthermore, the present invention implements a voice recognition device for accurately recognizing only a user's voice signal except a noise signal in a microphone detection signal.

In an aspect, a method of intelligently recognizing, by a voice recognition device, a voice, includes determining the size of a first voice signal if the first voice signal is recognized through the voice recognition device, adjusting the size of a microphone detection signal based on the size of the first voice signal if the microphone detection signal is obtained through a microphone of the voice recognition device after the first voice signal is recognized, and recognizing a second voice signal in the adjusted microphone detection signal.

Determining the size of a first voice signal may include determining whether the first voice signal is an activation speech for activating a voice recognition function of the voice recognition device and determining the size of the first voice signal based on a result of the determination.

Determining the size of the first voice signal may include determining the size of the first voice signal for each frame of the first voice signal. Adjusting the size of a microphone detection signal may include adjusting the size of the microphone detection signal for each frame of the microphone detection signal.

Adjusting for each frame of the microphone detection signal may include determining an average gain of a first frame of the microphone detection signal, comparing the average gain of the first frame with a preset target gain, and increasing or decreasing the gain of the first frame by the target gain based on a result of the comparison.

The method may further include updating the target gain based on recognition ratio information of the recognized second voice signal.

Updating the target gain may include updating a pre-trained artificial neural network using the target gain and the recognition ratio information and updating the target gain with a threshold gain obtained by inputting a preset threshold recognition ratio to the updated artificial neural network.

The method may further include receiving, from a network, downlink control information (DCI) used to schedule the transmission of the target gain and the recognition ratio information and transmitting the target gain and the recognition ratio information to the network based on the DCI.

The method may further include performing an initial access procedure with the network based on a synchronization signal block (SSB) and transmitting the target gain and the recognition ratio information to the network through a PUSCH. The SSB and the DM-RS of the PUSCH are QCLed with respect to QCL type D.

The method may further include controlling a communication unit to transmit the target gain and the recognition ratio information to an AI processor included in the network and controlling the communication unit to receive AI-processed information from the AI processor. The AI-processed information may include the threshold gain obtained by inputting the threshold recognition ratio to the artificial neural network included in the AI processor using the target gain and the recognition ratio information.

The preset target gain is −15 dB.

In an aspect, a voice recognition device intelligently recognizing a voice includes at least one microphone configured to detect a signal and a processor configured to determine the size of a first voice signal if the first voice signal is recognized, adjust the size of a microphone detection signal based on the size of the first voice signal if the microphone detection signal is obtained through the at least one microphone after the first voice signal is recognized, and recognize a second voice signal in the adjusted microphone detection signal.

The processor may be configured to determine whether the first voice signal is an activation speech for activating a voice recognition function of the voice recognition device and to determine the size of the first voice signal based on a result of the determination.

The processor may be configured to determine the size of the first voice signal for each frame of the first voice signal and to adjust the size of the microphone detection signal for each frame of the microphone detection signal.

The processor may be configured to determine an average gain of a first frame of the microphone detection signal, compare the average gain of the first frame with a preset target gain, and increase or decrease the gain of the first frame by the target gain based on a result of the comparison.

The processor may be configured to update the target gain based on recognition ratio information of the recognized second voice signal.

The processor may be configured to update a pre-trained artificial neural network using the target gain and the recognition ratio information and to update the target gain with a threshold gain obtained by inputting a preset threshold recognition ratio to the updated artificial neural network.

The voice recognition device further includes a communication unit configured to transmit or receive data to or from a network. The processor may be configured to control the communication unit to receive, from the network, downlink control information (DCI) used to schedule the transmission of the target gain and the recognition ratio information and transmit the target gain and the recognition ratio information to the network based on the DCI.

The processor may be configured to control the communication unit to perform an initial access procedure with the network based on a synchronization signal block (SSB) and to transmit the target gain and the recognition ratio information to the network through a PUSCH. The SSB and a DM-RS of the PUSCH may be QCLed with respect to QCL type D.

The processor may be configured to control the communication unit to transmit the target gain and the recognition ratio information to an AI processor included in the network and to receive AI-processed information from the AI processor. The AI-processed information may include the threshold gain obtained by inputting the threshold recognition ratio to the artificial neural network included in the AI processor using the target gain and the recognition ratio information.

The preset target gain is −15 dB.

In an aspect, a non-transitory computer-readable recording medium is a non-transitory computer-readable recording medium in which a computer-executable component configured to be executed in one or more processor of a computing device is stored. The computer-executable component may be configured to determine the size of a first voice signal if the first voice signal is recognized, adjust the size of a microphone detection signal based on the size of the first voice signal if the microphone detection signal is obtained through at least one microphone after the first voice signal is recognized, and recognize a second voice signal in the adjusted microphone detection signal.

BRIEF DESCRIPTION OF THE DRAWINGS

The accompanying drawings, included as part of the detailed description in order to provide a thorough understanding of the present invention, provide embodiments of the present invention and together with the description, describe the technical features of the present invention.

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 shows an example of a schematic block diagram in which a text-to-speech (TTS) method according to an embodiment of the present invention is implemented.

FIG. 5 shows a block diagram of an AI device that may be applied to one embodiment of the present invention.

FIG. 6 is an exemplary block diagram of a voice recognition apparatus according to an embodiment of the present invention.

FIG. 7 shows a schematic block diagram of a text-to-speech (TTS) device in a TTS system according to an embodiment of the present invention.

FIG. 8 is a schematic block diagram of a TTS device in a TTS system environment according to an embodiment of the present invention.

FIG. 9 is a schematic block diagram of an AI processor capable of performing emotion classification information-based TTS according to an embodiment of the present invention.

FIG. 10 is a flowchart showing a voice recognition method according to an embodiment of the present invention.

FIG. 11 shows an example in which a voice recognition device recognizes an activation speech and a continuous speech.

FIG. 12 is a detailed flowchart showing the step of determining a first voice signal (step S110 of FIG. 10).

FIG. 13 is a detailed flowchart showing the step of adjusting the size of a microphone detection signal (step S150 of FIG. 10).

FIG. 14 is a diagram illustrating a process of determining the size of a microphone detection signal for each frame.

FIG. 15 is a diagram illustrating a process of adjusting the size of a microphone detection signal for each frame.

FIG. 16 is a flowchart showing a process of updating a target gain.

FIG. 17 is a flowchart showing a process of performing the process of updating a target gain in FIG. 16 using a 5G network.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
  - When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

H. Voice Recognition System and AI Processing

FIG. 4 illustrates a block diagram of a schematic system in which a voice recognition method is implemented according to an embodiment of the present invention.

Referring to FIG. 4, a system in which a voice recognition method is implemented according to an embodiment of the present invention may include as a voice recognition device 10, a network system 16, and a text-to-to-speech (TTS) system as a speech synthesis engine.

The at least one voice recognition device 10 may include a mobile phone 11, a PC 12, a notebook computer 13, and other server devices 14. The PC12 and notebook computer 13 may connect to at least one network system 16 via a wireless access point 15. According to an embodiment of the present invention, the voice recognition device 10 may include an audio book and a smart speaker.

Meanwhile, the TTS system 18 may be implemented in a server included in a network, or may be implemented by on-device processing and embedded in the voice recognition device 10. In the exemplary embodiment of the present invention, it is assumed that the TTS system 18 is implemented in the voice recognition device 10.

FIG. 5 shows a block diagram of an AI device that may be applied to one embodiment of the present invention.

The AI device 20 may include an electronic device including an AI module capable of performing AI processing or a server including the AI module. In addition, the AI device 20 may be included in at least a part of the voice recognition device 10 illustrated in FIG. 4 and may be provided to perform at least some of the AI processing together.

The AI processing may include all operations related to the voice recognition of the voice recognition device 10 shown in FIG. 5. For example, the AI processing may be a process of obtaining a threshold gain corresponding to a threshold recognition ratio by analyzing the threshold recognition ratio of the voice recognition device 10.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25.

In particular, the AI processor 21 may train a neural network for obtaining a threshold gain by analyzing a threshold recognition ratio. In this case, the neural network for recognizing a threshold gain may be designed to simulate the human's brain structure on a computer, and may include a plurality of network nodes that simulate neurons of the human's neural network and have weight.

The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like.

The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by obtaining learning data to be used for learning and by applying the obtaind learning data to the deep learning model.

The learning data acquisition unit 23 may obtain learning data for a neural network model for classifying and recognizing data. For example, the learning data acquisition unit 23 may obtain a threshold recognition ratio to be input to the neural network model and/or a feature value extracted from the threshold recognition ratio, as learning data.

The model learning unit 24 can perform learning such that a neural network model has a determination reference about how to classify predetermined data, using the obtained learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor may pre-process an obtained threshold recognition ratio so that the obtained threshold recognition ratio is used for training for recognizing a threshold gain. For example, the learning data preprocessor may process an obtained threshold recognition ratio in a preset format so that the model training unit 24 may use obtained learning data for training for threshold gain recognition.

Further, the learning data selector can select data necessary for learning from learning data obtained by the learning data acquisition unit 23 or learning data pre-processed in the pre-processor. For example, the learning data selection unit may select only data for a syllable, included in a specific region, as learning data by detecting the specific region in the feature value of a threshold recognition ratio obtained by the voice recognition device 10.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 6 is an exemplary block diagram of a voice recognition apparatus according to an embodiment of the present invention.

One embodiment of the present invention may include computer readable and computer executable instructions that may be included in the voice recognition device 10. Although FIG. 6 discloses a plurality of components included in the voice recognition device 10, the components not disclosed may be included in the voice recognition device 10.

A plurality of voice recognition apparatuses may be applied to one voice recognition apparatus. In such a multi-device system the voice recognition apparatus may comprise different components for performing various aspects of voice recognition processing. The voice recognition device 10 shown in FIG. 6 is exemplary and may be an independent apparatus or may be implemented as a component of a larger apparatus or system.

One embodiment of the present invention may be applied to a plurality of different devices and computer systems, for example, a general purpose computing system, a server-client computing system, a telephone computing system, a laptop computer, a portable terminal, a PDA, a tablet computer, and the like. The voice recognition device 10 may also be applied to one component of another device or system that provides voice recognition such as automated teller machines (ATMs), kiosks, global positioning systems (GPS), home appliances (eg, refrigerators, ovens, washing machines, etc.), vehicles (vehicles), e-book readers.

As shown in FIG. 6, the voice recognition device 10 includes a communication unit 110, an input unit 120, an output unit 130, a memory 140, a sensing unit 150, an interface unit 160, and a power supply unit 190 and/or processor 170. On the other hand, some of the components disclosed in the voice recognition device 10 may appear as a single component several times in one device.

The voice recognition device 10 may include an address/data bus (not shown) for transferring data between the components of the voice recognition device 10. Each component in the voice recognition device 10 may be directly connected to other components through the bus (not shown). Meanwhile, each component in the voice recognition device 10 may be directly connected to the processor 170.

More specifically, the communication unit 110 may include one or more modules that enable communication between the above components, wireless communication between the voice recognition device 10 and the wireless communication system, between the voice recognition device 10 and another electronic device, or between the voice recognition device 10 and an external server. In addition, the communication unit 110 may include one or more modules for connecting the voice recognition device 10 to one or more networks.

The communication unit 110 may be a wireless communication device such as a radio frequency (RF), an infrared (Infrared), Bluetooth, a wireless local area network (WLAN) (Wi-Fi, etc.) or 5G network, a Long Term Evolution (LTE) network, wireless network wireless devices such as WiMAN networks, 3G networks.

The communication unit 110 may include at least one of a broadcast receiving module, a mobile communication module, a wireless internet module, a short range communication module, and a location information module.

The input unit 120 may include a microphone, a touch input unit, a keyboard, a mouse, a stylus, or another input unit.

In addition, the input unit 120 may include a camera or an image input unit for inputting an image signal, a microphone or an audio input unit for inputting an audio signal, and a user input unit (eg, a touch key, push key (mechanical key, etc.)) for receiving information from a user. The voice data or the image data collected by the input unit 120 may be analyzed and processed as a control command of the user.

The sensing unit 150 may include one or more sensors for sensing at least one of information in the voice recognition device 10, surrounding environment information surrounding the voice recognition device 10, and user information.

For example, the sensing unit 150 may include at least one of a proximity sensor, an illumination sensor, a touch sensor, an acceleration sensor, a magnetic sensor, and a gravity sensor (G-sensor), gyroscope sensor, motion sensor, RGB sensor, infrared sensor (IR sensor), fingerprint scan sensor, ultrasonic sensor, optical sensor (e.g., imaging means), microphones, battery gauges, environmental sensors (e.g. barometers, hygrometers, thermometers, radiation sensors, heat sensors, gas sensors, etc.), a chemical sensor (eg, electronic nose, healthcare sensor, biometric sensor, etc.). Meanwhile, the voice recognition device 10 disclosed herein may use a combination of information sensed by at least two or more of these sensors.

The output unit 130 may output information (for example, voice) processed by the voice recognition device 10 or another device. The output unit 130 may include a speaker, a headphone, or other suitable component for propagating voice. As another example, the output unit 130 may include an audio output unit. In addition, the output unit 130 may include a display (visual display or tactile display), audio speakers, headphones, printer or other output unit. The output unit 130 may be integrated into the voice recognition device 10 or may be implemented separately from the voice recognition device 10.

The output unit 130 is used to generate an output related to visual, auditory or tactile, and may include at least one of a display unit, an audio output unit, a hap tip module, and an optical output unit. The display unit may form a layer structure or an integrated structure with the touch sensor, thereby implementing a touch screen. Such a touch screen may serve as a user input means for providing an input interface between the augmented reality voice recognition device 10 and the user, and at the same time, provide an output interface between the augmented reality type of voice recognition device 10 and the user.

Input 120 and/or output 130 may also include an interface for connecting external peripherals such as Universal Serial Bus (USB), FireWire, Thunderbolt or other connection protocols. Input 120 and/or output 130 may also include a network connection, such as an Ethernet port, modem, or the like. The voice recognition device 10 may be connected to the Internet or a distributed computing environment through the input unit 120 and/or the output unit 130. In addition, the voice recognition device 10 may be connected to a removable or external memory (eg, a removable memory card, a memory key drive, a network storage, etc.) through the input unit 120 or the output unit 130.

The interface unit 160 serves as a path to various types of external devices connected to the voice recognition device 10. The voice recognition device 10 may receive virtual reality or augmented reality content from an external device through the interface unit 160, and may interact with each other by exchanging various input signals, sensing signals, and data.

For example, the interface unit 160 may include a device equipped with a wired/wireless headset port, an external charger port, a wired/wireless data port, a memory card port, and an identification module. It may include at least one of a port connecting, an audio input/output (I/O) port, a video input/output (I/O) port, and an earphone port. The memory 140 may store data and instructions. The memory 140 may include a magnetic storage, an optical storage, a solid-state storage type, and the like.

The memory 140 may include volatile RAM, nonvolatile ROM, or another type of memory.

In addition, the memory 140 stores data supporting various functions of the voice recognition device 10. The memory 140 may store a plurality of application programs or applications that are driven in the voice recognition device 10, data for operating the voice recognition device 10, and instructions. At least some of these applications may be downloaded from an external server via wireless communication. At least some of these application programs may be present on the voice recognition device 10 from the time of shipment for the basic functions of the voice recognition device 10 (for example, a call forwarding, a calling function, a message receiving, and a calling function).

The voice recognition device 10 may include a processor 170. The processor 170 may be connected to a bus (not shown), an input unit 120, an output unit 130, and/or other components of the voice recognition device 10. The processor 170 may correspond to a CPU for processing data, a computer readable instruction for processing data, and a memory for storing data and instructions.

In addition to the operations associated with the application, the processor 170 also typically controls the overall operation of the voice recognition device 10. The processor 170 may process signals, data, information, and the like, which are input or output through the above-described components.

In addition, the processor 170 may control at least some of the components by driving an application program stored in the memory 140 to provide appropriate information to the user or to process a function. In addition, the processor 170 may operate at least two or more of the components included in the voice recognition device 10 in combination with each other to drive an application program.

In addition, the processor 170 may detect the movement of the voice recognition device 10 or the user by using a gyroscope sensor, a gravity sensor, a motion sensor, or the like included in the sensing unit 150. Alternatively, the processor 170 may detect an object approaching to the voice recognition device 10 or the user by using a proximity sensor, an illumination sensor, a magnetic sensor, an infrared sensor, an ultrasonic sensor, an optical sensor, etc. included in the sensing unit 150. In addition, the processor 170 may detect a user's movement through sensors provided in a controller that operates in conjunction with the voice recognition device 10.

In addition, the processor 170 may perform an operation (or function) of the voice recognition device 10 using an application program stored in the memory 140.

Computer instructions to be processed in the processor 170 for operating the voice recognition device 10 and various components may be executed by the processor 170 and may include a memory 140, an external device, or a processor to be described later. It may be stored in the memory or storage included in (170). Alternatively, all or some of the executable instructions may be embedded in hardware or firmware in addition to software. One embodiment of the invention may be implemented in various combinations of software, firmware and/or hardware, for example.

In detail, the processor 170 may process the text data into an audio waveform including voice, or may process the audio waveform into text data. The source of the textual data may be generated by an internal component of the voice recognition device 10. In addition, the source of the text data may be received from the input unit such as a keyboard or transmitted to the voice recognition device 10 through a network connection. The text may be in the form of sentences that include text, numbers, and/or punctuation for conversion by the processor 170 into speech. The input text may also include a special annotation for processing by the processor 170, and may indicate how the specific text should be pronounced through the special annotation. The text data may be processed in real time or later stored and processed.

In addition, although not shown in FIG. 6, the processor 170 may include a front end, a speech synthesis engine, and a TTS storage. The preprocessor may convert the input test data into a symbolic linguistic representation for processing by the speech synthesis engine. The speech synthesis engine may convert the input text into speech by comparing annotated phonetic units models with information stored in the TTS storage. The preprocessor and the speech synthesis engine may include an embedded internal processor or memory, or may use the processor 170 and the memory 140 included in the voice recognition device 10. Instructions for operating the preprocessor and the speech synthesis engine may be included in the processor 170, the memory 140 of the voice recognition device 10, or an external device.

Text input to the processor 170 may be sent to the preprocessor for processing. The preprocessor may include a module for performing text normalization, linguistic analysis, and linguistic prosody generation.

During the text normalization operation, the preprocessor processes the text input and generates standard text, converting numbers, abbreviations, and symbols the same as they are written.

During the language analysis operation, the preprocessor may analyze the language of the normalized text to generate a series of phonetic units corresponding to the input text. This process may be called phonetic transcription.

Phonetic units are finally combined to include symbolic representations of sound units output by the voice recognition device 10 as speech. Various sound units can be used to segment text for speech synthesis.

Processor 170 includes phonemes (individual sounds), half-phonemes, di-phones (the last half of a phoneme combined with the first half of adjacent phonemes) and bi-phones. Speech can be processed based on two successive sonic speeds, syllables, words, phrases, sentences, or other units. Each word may be mapped to one or more phonetic units. Such mapping may be performed using a language dictionary stored in the voice recognition device 10.

Linguistic analysis performed by the preprocessor may also involve identifying different grammatical elements, such as prefixes, suffixes, phrases, punctuation, and syntactic boundaries. Such grammatical components can be used by the processor 170 to produce natural audio waveform output. The language dictionary may also include letter-to-sound rules and other tools that may be used to pronounce previously unverified words or letter combinations that may be generated by the processor 170. In general, the more information included in the language dictionary, the higher the quality of voice output can be guaranteed.

Based on the language analysis, the preprocessor may perform language rhythm generation annotated to phonetic units with prosodic characteristics indicating how the final sound unit should be pronounced in the final output speech.

The rhyme characteristics may also be referred to as acoustic features. During the operation of this step, the preprocessor may integrate into the processor 170 taking into account any prosodic annotations involving text input. Such acoustic features may include pitch, energy, duration, and the like. Application of the acoustic feature may be based on prosodic models available to the processor 170.

This rhyme model represents how phonetic units should be pronounced in certain situations. For example, a rhyme model can include a phoneme's position in a syllable, a syllable's position in a word, or a word's position in a sentence or phrase, phrases neighboring phonetic units, and the like. Like the language dictionary, the more information of the prosodic model, the higher the quality of voice output can be guaranteed.

The output of the preprocessor may include a series of speech units annotated with prosodic characteristics. The output of the preprocessor may be referred to as a symbolic linguistic representation. The symbolic language representation may be sent to a speech synthesis engine.

The speech synthesis engine performs a process of converting a speech into an audio waveform for output to the user through the output unit 130. The speech synthesis engine may be configured to convert the input text into high quality natural speech in an efficient manner. Such high quality speech can be configured to pronounce as much as possible a human speaker.

The speech synthesis engine may perform speech synthesis using at least one other method.

The Unit Selection Engine contrasts a recorded speech database with a symbolic linguistic representation generated by the preprocessor. The unit selection engine matches the symbol language representation with the speech audio unit of the speech database. Matching units can be selected to form a speech output and the selected matching units can be connected together. Each unit has only an audio waveform corresponding to a phonetic unit, such as a short .wav file of a particular sound, with a description of the various acoustic characteristics associated with the .wav file (pitch, energy, etc.). In addition, the speech unit may include other information such as a word, a sentence or a phrase, a location displayed on a neighboring speech unit.

The unit selection engine can match the input text using all the information in the unit database to produce a natural waveform. The unit database may include an example of a number of speech units that provide different options to the voice recognition device 10 for connecting the units in speech. One of the advantages of unit selection is that natural voice output can be produced depending on the size of the database. In addition, as the unit database is larger, the voice recognition device 10 may configure natural speech.

On the other hand, there is a parameter synthesis method in addition to the above-described unit selection synthesis. Parametric synthesis allows synthesis parameters such as frequency, volume and noise to be modified by a parametric synthesis engine, a digital signal processor, or other audio generating device to produce an artificial speech waveform.

Parametric synthesis can be matched to a desired linguistic representation desired output speech parameter using an acoustic model and various statistical techniques. Parameter synthesis not only processes speech without the large database associated with unit selection, but also enables accurate processing at high processing speeds. The unit selection synthesis method and the parameter synthesis method may be performed separately or in combination to generate a voice audio output.

Parametric speech synthesis may be performed as follows. The processor 170 may include an acoustic model capable of converting a symbolic linguistic representation into a synthetic acoustic waveform of the text input based on the audio signal manipulation. The acoustic model may include rules that may be used by the parameter synthesis engine to assign specific audio waveform parameters to input speech units and/or prosodic annotations. The rule can be used to calculate a score indicating the likelihood that a particular audio output parameter (frequency, volume, etc.) corresponds to the portion of the input symbolic language representation from the preprocessor.

The parametric synthesis engine may apply a plurality of techniques to match the voice to be synthesized with the input speech unit and/or the rhyme annotation. One common technique uses the Hidden Markov Model (HMM), which can be used to determine the probability that an audio output should match text input. The HMM can be used to convert the parameters of language and acoustic space into parameters to be used by a vocoder (digital voice encoder) to artificially synthesize the desired speech.

The voice recognition device 10 may also include a speech unit database for use in unit selection. The voice unit database may be stored in memory 140 or other storage configuration. The voice unit database may include recorded speech utterance. The speech utterance may be text corresponding to the speech content. In addition, the speech unit database may include recorded speech (in the form of audio waveforms, feature vectors or other formats) that takes up significant storage space in the voice recognition device 10. Unit samples of the speech unit database may be classified in a variety of ways, including speech units (phonemes, diphonies, words, etc.), linguistic rhyme labels, sound feature sequences, speaker identities, and the like. Sample utterance can be used to generate a mathematical model corresponding to the desired audio output for a particular speech unit.

When the speech synthesis engine matches the symbolic language representation, it may select a unit in the speech unit database that most closely matches the input text (including both speech units and rhythm annotations). In general, the larger the voice unit database, the greater the number of selectable unit samples, thus enabling accurate speech output.

The processor 170 may transmit audio waveforms including audio output to the output unit 130 for output to the user. The processor 170 may store the audio waveform including speech in the memory 140 in a plurality of different formats, such as a series of feature vectors, uncompressed audio data, or compressed audio data. For example, processor 170 may encode and/or compress voice output using an encoder/decoder prior to the transmission. The encoder/decoder may encode and decode audio data such as digitized audio data, feature vectors, and the like. In addition, the functions of the encoder/decoder may be located in separate components or may be performed by the processor 170.

The memory 140 may store other information for voice recognition. The contents of memory 140 may be prepared for general voice recognition and TTS use, and may be customized to include sounds and words that are likely to be used in a particular application. For example, the TTS storage may include customized voice specialized for location and navigation for TTS processing by the GPS device.

The memory 140 may also be customized to the user based on the personalized desired voice output. For example, a user may prefer a voice that is output to a specific gender, a specific intonation, a specific speed, a specific emotion (eg, a happy voice). The speech synthesis engine may include a specialized database or model to describe such user preferences.

The voice recognition device 10 may also be configured to perform TTS processing in multiple languages. For each language, processor 170 may include data, instructions, and/or components specifically configured to synthesize speech in a desired language.

The processor 170 may modify or update the contents of the memory 140 based on the feedback on the result of the TTS processing to improve performance, so that the processor 170 may improve awareness of the voice more than the capability provided by the training corpus.

As the processing power of the voice recognition device 10 is improved, the speech output may be performed by reflecting the emotion attribute of the input text. Alternatively, even if the input text is not included in the emotion attribute, the voice recognition device 10 may output the voice by reflecting the intention (emotional information) of the user who created the input text.

Indeed, when a model is built that will be integrated into a TTS module that performs TTS processing, the TTS system may integrate the various components mentioned above with other components. For example, the voice recognition device 10 may include a block for setting a speaker.

The speaker setting unit may set the speaker for each character appearing in the script. The speaker setup unit may be integrated into the processor 170 or may be integrated as part of the preprocessor or speech synthesis engine. The speaker setting unit synthesizes text corresponding to a plurality of characters into a set speaker's voice using metadata corresponding to a speaker profile.

According to an embodiment of the present invention, a markup language may be used as the meta data, and preferably, speech synthesis markup language (SSML) may be used.

The power supply unit 190 receives power from an external power source or an internal power source under the control of the processor 170 to supply power to each component included in the voice recognition device 10. The power supply unit 190 includes a battery, and the battery may be provided in a built-in or replaceable form.

Hereinafter, a speech processing procedure performed by a device environment and/or a cloud environment or server environment will be described with reference to FIGS. 7 and 8. FIG. 7 shows an example in which, while a speech can be received in a device 50, a procedure of processing the received speech and thereby synthesize the speech, that is, overall operations of speech synthesis, is performed in a cloud environment 60. On the contrary, FIG. 8 shows an example of on-device processing indicating that a device 70 performs the aforementioned overall operations of speech synthesis by processing a received speech and thereby synthesizing the speech.

In FIGS. 7 and 8, the device environments 70 may be referred to as client devices, and the cloud environments 60 and 80 may be referred to as servers.

FIG. 7 shows a schematic block diagram of a text-to-speech (TTS) device in a TTS system according to an embodiment of the present invention.

In order to process a speech event in an end-to-end speech UI environment, various configurations are required. A sequence for processing the speech event performs signal acquisition playback, speech pre-processing, voice activation, voice recognition, natural language processing, and speech synthesis by which a device responds to a user.

The client device 50 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

According to an embodiment, the input module may include at least one microphone capable of receiving a user's utterance as a speech signal. The input module may include a speech input system and receive a user's speech as a speech signal through the speech input system. By generating an input signal for an audio input, the at least one microphone may determine a digital input signal for a user's speech. According to an embodiment, multiple microphones may be implemented as an array. The array may be arranged in a geometric pattern, for example, a linear geometric shape, a circular geometric shape, or a different random shape. For example, the array may be in a pattern in which four sensors are placed at 90 degrees to receive sound from four directions. In some embodiments, the microphone may include sensors of different arrays in a space of data communication, and may include a networked array of the sensors. The microphone may include an omnidirectional microphone and a directional microphone (e.g., a shotgun microphone).

The client device 50 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are essential to process a user speech, is generally performed in Cloud due to computing, storage, power limitations, and the like. The Cloud may include the cloud environment 60 can include a cloud device that processes a user input transmitted from a client. The cloud environment 60 may exist as a server.

The cloud environment 60 may include an auto voice recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front-perform a Fourier transform on the speech input to extract spectral features that characterize the speech input as a sequence of representative multi-dimensional vectors. In addition, The ASR module 61 may include one or more voice recognition modules (e.g., an acoustic model and/or a language module) and may realize one or more voice recognition engines. Examples of the voice recognition model include Hidden Markov Models, Gaussian-Mixture Models, Deep Neural Network Models, n-gram language models, and other statistical models. Examples of the voice recognition model include a dynamic time warping (DTW)-based engine and a weighted finite state transducer (WFST)-based engine. The one or more voice recognition models and the one or more voice recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 732 for intention deduction. In some examples, The ASR module 730 generates multiple candidate text expressions for a speech input. Each candidate text expression is a sequence of works or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may determine the intent of the user and a parameter using a matching rule which is divided into a domain, intent, and a parameter. For example, one domain (e.g., an alarm) may include a plurality of intents (e.g., alarm setting, alarm release, and the like), and one intent may need a plurality of parameters (e.g., a time, the number of iterations, an alarm sound, and the like). The plurality of rules may include, for example, one or more mandatory parameters. The matching rule may be stored in a natural language understanding database.

According to an embodiment, the NLU module 63 may determine a meaning of a word extracted from a user input using a linguistic feature (e.g., a syntactic element) such as a morpheme or a phrase and may match the determined meaning of the word to the domain and intent to determine the intent of the user. For example, the NLU module 63 may determine the intent of the user by calculating how many words extracted from a user input are included in each of the domain and the intent. According to an embodiment, the NLU module 63 may determine a parameter of the user input using a word which is the basis for determining the intent. According to an embodiment, the NLU module 63 may determine the intent of the user using a NLU DB which stores the linguistic feature for determining the intent of the user input. According to another embodiment, the NLU module 63 may determine the intent of the user using a personal language model (PLM). For example, the NLU module 63 may determine the intent of the user using personalized information (e.g., a contact list, a music list, schedule information, social network information, etc.). For example, the PLM may be stored in, for example, the NLU DB. According to an embodiment, the ASR module 61 as well as the NLU module 63 may recognize a voice of the user with reference to the PLM stored in the NLU DB.

According to an embodiment, the NLU module 63 may further include a natural language generating module (not shown). The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63 of the LNU module 63, may change the text input to information in a voice form, and may transmit the information in the voice form to the client device 50. The client device 50 may output the information in the voice form via the speaker.

The speech synthesis module 64 synthesizes speech outputs based on a provided text. For example, a result generated by the ASR module 61 may be in the form of a text string. The speech synthesis module 64 may convert the text string to an audible speech output. The speech synthesis module 64 may use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis.

In some examples, the speech synthesis module 64 may be configured to synthesize individual words based on phonemic strings corresponding to the words. For example, a phonemic string can be associated with a word in a generated text string. The phonemic string can be stored in metadata associated with the word. The speech synthesis model 64 may be configured to directly process the phonemic string in the metadata to synthesize the word in speech form.

Since the cloud environment generally has more processing capabilities or resources than the client device, a higher quality speech output may be obtained in synthesis on the client side. However, the present invention is not limited thereto, and the speech synthesis process may be performed on the client side (see FIG. 8).

Meanwhile, according to an embodiment, the client environment may further include an Artificial Intelligence (AI) agent 62. The AI processor 62 is defined to perform at least some of the above-described functions performed by the ASR module 61, the NLU module 62 and/or the TTS module 64. In addition, the AI module 62 may make contribution so that the ASR module 61, the NLU module 62 and/or the TTS module 64 perform independent functions, respectively.

The AI processor module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, voice recognition, natural language processing, speech/signal processing, and the like.

Currently, all commercial voice recognition systems (Microsoft's Cortana, Skype translator, Google Now, Apple Siri, etc.) are based on deep learning techniques.

In particular, the AI processor module 62 may perform various natural language processes, including machine translation, emotion analysis, and information retrieval, to process natural language by use of a deep artificial neural network architecture.

Meanwhile, the cloud environment may include a service manager 65 capable of collecting various personalized information and supporting a function of the AI processor 62. The personalized information obtaind through the service manager may include at least one data (a calendar application, a messaging service, usage of a music application, etc.) used through the cloud environment, at least one sensing data (a camera, a microphone, temperature, humidity, a gyro sensor, C-V2X, a pulse, ambient light, Iris scan, etc.) collected by the client device 50 and/or the cloud environment 60, off device data directly not related to the client device 50. For example, the personalized information may include maps, SMS, news, music, stock, weather, Wikipedia information.

For convenience of explanation, the AI processor 62 is represented as an additional block to be distinguishable from the ASR module 61, the NLU module 63, and the TTS module 64, but the AI processor 62 may perform at least some or all of the functions of the respective modules 61, 62, and 64.

In FIG. 7, an example in which the AI processor 62 is implemented in the cloud environment due to computing calculation, storage, power limitations, and the like, but the present invention is not limited thereto.

For example, FIG. 8 is identical to what is shown in FIG. 7, except for a case where the AI processor is included in the cloud device.

FIG. 8 is a schematic block diagram of a TTS device in a TTS system environment according to an embodiment of the present invention. A client device 70 and a cloud environment 80 shown in FIG. 8 may correspond to the client device 50 and the cloud environment 60 aforementioned in FIG. 7, except for some configurations and functions. Accordingly, description about specific functions of corresponding blocks may refer to FIG. 7.

Referring to FIG. 8, the client device 70 may include a pre-processing module 51, a voice activation module 72, an ASR module 73, an AI processor 74, an NLU module 75, and a TTS module 76. In addition, the client device 50 may include an input module (at least one microphone) and at least one output module.

In addition, the cloud environment may include cloud knowledge 80 that stores personalized information in a knowledge form.

A function of each module shown in FIG. 8 may refer to FIG. 7. However, since the ASR module 73, the NLU module 75, and the TTS module 76 are included in the client device 70, communication with Cloud may not be necessary for a speech processing procedure such as voice recognition, speech synthesis, and the like, and thus, an instant real-time speech processing operation is possible.

Each module shown in FIGS. 7 and 8 are merely an example for explaining a speech processing procedure, and modules more or less than in FIGS. 7 and 8 may be included. In addition, two or more modules may be combined or different modules or modules with different arrangement structures may be included. The various modules shown in FIGS. 7 and 8 may be implemented in hardware, software instructions for execution by one or more processors, firmware, including one or more signal processing and/or application specific integrated circuits, or a combination thereof.

FIG. 9 is a schematic block diagram of an AI processor capable of performing emotion classification information-based TTS according to an embodiment of the present invention.

Referring to FIG. 9, in the speech processing procedure described with reference to FIGS. 7 and 8, the AI processor 74 may support an interactive operation with a user, in addition to an ASR operation, an NLU operation, and a TTS operation. Alternatively, using context information, the AI processor 74 may make contribution so that the NLU module 63 further clarify, complements, or additionally define information included in text expressions received from the ASR module 61.

Here, the context information may include preference of a user of a client device, hardware and/or software states of the client device, various types of sensor information received before, during, or after a user input, previous interactions (e.g., dialogue) between the AI processor and the user, etc. In the present disclosure, the context information is dynamic and varies depending on time, location, contents of the dialogue, and other elements.

The AI processor 74 may further include a context fusion and learning module 91, a local knowledge 92, and a dialogue management 93.

The context fusion and learning module 91 may learn a user's intent based on at least one data. The at least one data may further include at least one sensing data obtaind by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a voice recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI processor 74 may detect presence of a speech from the input audio signal. According to an embodiment the AI processor 74 differentiates a speech data and a non-speech data using a deep neural networks (DNN) model. In addition, the AI processor 74 may perform emotion classification information on the speech data using the DNN model. According to the emotion classification information, the speech data may be classified as anger, boredom, fear, happiness, or sadness.

The contest fusion and learning module 91 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be obtaind through the above-described DNN model.

The AI processor 74 may include the local knowledge 92. The local knowledge 92 may include user data. The user data may include a user's preference, the user's address, the user's initially set language, the user's contact list, etc. According to an embodiment, the AI processor 74 may additionally define the user's intent by complementing information included in the user's speech input using the user's specific information. For example, in response to the user's request "Invite my friends to my birthday party", the AI processor 74 does not request more clarified information from the user and may utilize the local knowledge 92 to determine who "the friends" are and when and where the "birthday" takes place.

The AI processor 74 may further include the dialogue management 93. The AI processor 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

I. Voice Recognition Method of Intelligent Voice Recognition Device

FIG. 10 is a flowchart showing a voice recognition method according to an embodiment of the present invention.

As shown in FIG. 10, a voice recognition device (e.g., the voice recognition device 11, 12, 13, 14 or 15 of FIG. 4 or the voice recognition device 10 of FIG. 6) or an AI device (e.g., the AI device 20 of FIG. 5) according to an embodiment of the present invention may perform a voice recognition method including step S100 (S110, S130, S150, S170) of FIG. 10. Hereinafter, it is assumed that step S100 is performed in the voice recognition device 10, but does not need to be essentially limited thereto.

Steps S110, S130, S150 and S170 may be performed by the processor (e.g., the processor 170 of FIG. 6) of a voice recognition device or the AI processor (e.g., the AI processor 21 of FIG. 5, the AI processor 62 of FIG. 7, the AI processor 74 of FIG. 8, or the AI processor 74 of FIG. 9) of an AI device. Hereinafter, it is assumed that steps S110, S130, S150 and S170 are performed by the processor 170 of the voice recognition device, but do not need to be essentially limited thereto.

Accordingly, a communication unit may be the communication unit (e.g., the communication unit 27 of FIG. 5) of an AI device or the communication unit (e.g., the communication unit 110 of FIG. 6) of a voice recognition device. Hereinafter, a memory may be the memory (e.g., the memory 25 of FIG. 5) of an AI device or the memory (e.g., the memory 140 of FIG. 6) of a voice recognition device.

First, the processor 170 may obtain a first voice signal (S110) through at least one microphone (e.g., the input unit 120 of FIG. 6) provided in the voice recognition device 10.

Specifically, the processor 170 may obtain the first voice signal in a signal detected through the at least one microphone 120. In this case, the processor 170 may obtain the first voice signal through the voice recognition activation module 52, 72 described with reference to FIG. 7, 8.

For example, the first voice signal may include a wake-up command (or activation speech) that recognizes a call from a user. That is, the voice recognition activation module 52, 72 may recognize a wake-up command (or activation speech) that recognizes a user's call in a signal detected through the at least one microphone 120. Specifically, the voice recognition activation module 62, 72 may detect a given keyword (e.g., "Hi, LG") in a signal that has experienced a pre-processing process and that is detected through the at least one microphone 120.

The processor 170 may determine the size of the first voice signal (S130).

Specifically, the processor 170 may determine a size (or gain) of the first voice signal for each frame, recognized through the voice recognition activation module 52, 72. That is, the processor 170 may determine the size of the first voice signal for each frame in the entire section.

Thereafter, the processor 170 may adjust the size of a microphone detection signal based on the size of the first voice signal (S150).

Specifically, the processor 170 may obtain the microphone detection signal, detected by the at least one microphone 120, in real time, and may automatically adjust the size of the microphone detection signal based on the size of the first voice signal. For example, the processor 170 may adjust the size of the microphone detection signal for each frame of the microphone detection signal based on the size of the first voice signal.

In this case, the processor 170 may adjust the size of the microphone detection signal for each frame by a difference between the gain of the first voice signal and a preset target gain. For example, if the size of the first voice signal is smaller than the preset target gain, the processor 170 may increase the size of a subsequently detected microphone detection signal by a difference between the size of the first voice signal and the preset target gain. In contrast, if the size of the first voice signal is the preset target gain or more, the processor 170 may decrease the size of a subsequently detected microphone detection signal by a difference between the size of the first voice signal and the preset target gain.

For example, the preset target gain may be −15 decibel (dB). In this case, the target gain may be related to a threshold recognition ratio at which the processor 170 or the natural language processing module 75 recognizes a voice signal in a microphone detection signal. For example, a set gain may be updated in real time based on the recognition ratio of the processor 170 or the natural language processing module 75 for a subsequent microphone detection signal.

Next, the processor 170 may recognize a second voice signal in the adjusted microphone detection signal (S170).

For example, the processor 170 may stably obtain second voice signal in a microphone detection signal having a size adjusted.

For example, the second voice signal may be a user's continuous speech (or command) spoken continuously to an activation speech. In this case, the natural language processing module 75 of the processor 170 may stably obtain the user's continuous speech (second voice signal) from a microphone detection signal having a size adjusted.

FIG. 11 shows an example in which a voice recognition device recognizes an activation speech and a continuous speech.

As shown in FIG. 11, the voice recognition device 10 may be a refrigerator 10. That is, the voice recognition device 10 may be a smart device or an IoT device, such as the refrigerator 10 of FIG. 11, but does not need to be essentially limited thereto and may be all types of devices capable of recognizing a user's voice.

As shown in FIG. 11, the voice recognition device 10 may obtain an activation speech (i.e., the first voice signal described with reference to FIG. 10) 1151 (e.g., "Hi, LG") spoken by a user 50.

The voice recognition device 10 may determine the size of the obtained activation speech, and may adjust the size of a signal detected through a microphone based on the size of the activation speech.

For example, if the user speaks a continuous speech 1152 (e.g., "Let me know temperature information") after speaking the activation speech 1151, the voice recognition device 10 may adjust the size of the continuous speech 1152 based on the size of the activation speech 1151.

For example, if the activation speech 1151 is recognized by the voice recognition device 10, the voice recognition device 10 may adjust the size of the continuous speech 1152 based on a preset target gain and the size of the activation speech 1151.

Specifically, if the size of the activation speech 1151 determined by the voice recognition device 10 is −18 dB, the voice recognition device 10 may increase the size of the continuous speech 1152 as much as 3 dB, that is, a difference between −15 dB, that is, a preset gain, and −18 dB, that is, the size of the activation speech. In this case, the size of the continuous speech 1152 may be assumed to be the same as the size of the activation speech 1151.

The user speaks the activation speech 1151 and the continuous speech 1152 at the same size (e.g., −18 dB in FIG. 11). Accordingly, the voice recognition device 10 can previously determine the size of the activation speech 1151, and can adjust the size of the continuous speech 1152 to be subsequently spoken to a preset optimal gain without a need to determine the size of the continuous speech 1152.

FIG. 12 is a detailed flowchart showing the step of determining a first voice signal (step S110 of FIG. 10).

As shown in FIG. 12, after step S110 is performed, the processor 170 of the voice recognition device 10 may determine whether the first voice signal is an activation speech (S1310).

If, as a result of the determination at step S1310, the first voice signal is not an activation speech, the processor 170 performs the process again from step S110.

If, as a result of the determination at step S1310, the first voice signal is recognized as an activation speech, the processor 170 may determine the size (or gain) of the activation speech (first voice signal) (S1320).

FIG. 13 is a detailed flowchart showing the step of adjusting the size of a microphone detection signal (step S150 of FIG. 10).

As shown in FIG. 14, after step S1310 is performed, the processor 170 may compare an average gain for each frame with a preset target gain (S1510).

If, as a result of the comparison, the gain of the activation speech is greater than the preset target gain, the processor 170 may decrease the microphone detection signal by a difference between the gain of the activation speech and the target gain (S1530). Next, the processor 170 may perform step S170.

If, as a result of the comparison, the gain of the activation speech is not greater than the preset target gain, the processor 170 may determine whether the gain of the activation speech is smaller than the preset target gain (S1540).

If, as a result of the determination, the gain of the activation speech is smaller than the preset target gain, the processor 170 may amplify the microphone detection signal by a difference between the gain of the activation speech and the target gain (S1550). Next, the processor 170 may perform step S170.

If, as a result of the determination, the gain of the activation speech is the same as the preset target gain, the processor 170 may perform step S170 without increasing or amplifying the microphone detection signal.

In steps S1530 and S1550 of FIG. 13, the processor 170 may determine the microphone detection signal for each frame of the microphone detection signal. This is described below with reference to FIGS. 14 and 15.

FIG. 14 is a diagram illustrating a process of determining the size of a microphone detection signal for each frame.

As shown in FIG. 14, the processor 170 may divide a continuous speech for each frame and determine the size of the continuous speech for each frame.

For example, the processor 170 may divide the entire section of the continuous speech into frames.

Thereafter, the processor 170 may determine a first gain, that is, an average gain of a first frame 1461, in a plurality of frames divided from the entire section.

Furthermore, the processor 170 may determine a second gain, that is, an average gain of a second frame 1462, in the plurality of frames divided from the entire section.

FIG. 15 is a diagram illustrating a process of adjusting the size of a microphone detection signal for each frame.

As shown in FIG. 15, after a gain is determined for each frame, the processor 170 may adjust the gain of the microphone detection signal for each frame.

For example, the processor 170 may amplify the microphone detection signal 1561 of the first frame by a difference between an activation speech and a preset target gain.

For example, the processor 170 may amplify the microphone detection signal 1562 of the second frame by a difference between an activation speech and a preset target gain.

FIG. 16 is a flowchart showing a process of updating a target gain.

As shown in FIG. 16, after a second voice signal (continuous speech) is recognized in an adjusted microphone detection signal, the processor 170 may perform the step S190 of updating a target gain by performing steps S1910, S1920, S1930, S1940, and S1950, which is described below in detail.

First, after performing the step (step S170) of recognizing the second voice signal, the processor 170 may set a current target gain and current recognition ratio information as a training set (S1910).

Specifically, after performing the step (step S170) of recognizing the second voice signal, the processor 170 may set current recognition ratio information, that is, the results of the recognition of the second voice signal, and a currently set target gain as a training set.

Next, the processor 170 may update a pre-trained artificial neural network using the training set, including the current target gain and the current recognition ratio information (S1920).

In this case, the pre-trained artificial neural network may be a deep learning model pre-trained to output a threshold gain for obtaining a target recognition ratio by obtaining the target recognition ratio as input.

That is, the processor 170 incorporates the recognition algorithm of the current voice recognition device 10 into an artificial neural network in real time by updating the artificial neural network using a current target gain and a current recognition ratio. Accordingly, the processor 170 can subsequently obtain a threshold gain for obtaining a target recognition ratio using the updated artificial neural network.

Next, the processor 170 may input a preset threshold recognition ratio to the updated artificial neural network (S1930). The preset threshold recognition ratio may be previously input by a user.

Next, the processor 170 may obtain a threshold gain based on a threshold recognition ratio as output of the artificial neural network (S1940).

Finally, the processor 170 may update a current target gain with the threshold gain.

FIG. 17 is a flowchart showing a process of performing the process of updating a target gain in FIG. 16 using a 5G network.

As shown in FIG. 17, the voice recognition device 10 may transmit a training set to a 5G network using a current target gain and current recognition ratio information obtained based on the current target gain as the training set (S1910).

In this case, the voice recognition device 10 may receive, from the network, downlink control information (DCI) used to schedule the transmission of the training set. In this case, the processor 170 of the voice recognition device 10 may receive the DCI from the network by controlling the communication unit.

In this case, the voice recognition device 10 may transmit the training set to the 5G network based on the DCI.

The voice recognition device 10 may perform an initial access procedure along with the network based on a synchronization signal block (SSB) before it receives the DCI used to schedule the transmission of the training set. Accordingly, the processor 170 may transmit the training set to the network through a PUSCH by controlling the communication unit. In this case, the SSB and the DM-RS of the PUSCH have been QCLed with respect to QCL type D.

Referring back to FIG. 17, the AI processor included in the 5G network may perform AI processing using the training set (S1920), and may transmit the results of the AI processing to the voice recognition device. This is described in detail below.

First, the AI processor may update an artificial neural network using the training set (S1921).

Next, the AI processor may input a threshold recognition ratio to the updated artificial neural network (S1922).

Finally, the AI processor may obtain a threshold gain as output of the artificial neural network (S1923).

The 5G network may transmit the threshold gain to the voice recognition device (S1931).

The voice recognition device may update a current target gain with the threshold gain (S1941).

J. Embodiment Summary

Embodiment 1: a method of intelligently recognizing, by a voice recognition device, a voice, includes the steps of determining the size of a first voice signal if the first voice signal is recognized through the voice recognition device, adjusting the size of a microphone detection signal based on the size of the first voice signal if the microphone detection signal is obtained through a microphone of the voice recognition device after the first voice signal is recognized, and recognizing a second voice signal in the adjusted microphone detection signal.

Embodiment 2: In Embodiment 1, the step of determining the size of a first voice signal may include the steps of determining whether the first voice signal is an activation speech for activating a voice recognition function of the voice recognition device and determining the size of the first voice signal based on a result of the determination.

Embodiment 3: In Embodiment 2, the step of determining the size of the first voice signal may include determining the size of the first voice signal for each frame of the first voice signal. The step of adjusting the size of a microphone detection signal may include adjusting the size of the microphone detection signal for each frame of the microphone detection signal.

Embodiment 4: In Embodiment 3, the step of adjusting for each frame of the microphone detection signal may include the steps of determining an average gain of a first frame of the microphone detection signal, comparing the average gain of the first frame with a preset target gain, and increasing or decreasing the gain of the first frame by the target gain based on a result of the comparison.

Embodiment 5: In Embodiment 4, the method may further include the step of updating the target gain based on recognition ratio information of the recognized second voice signal.

Embodiment 6: In Embodiment 5, the step of updating the target gain may include the steps of updating a pre-trained artificial neural network using the target gain and the recognition ratio information and updating the target gain with a threshold gain obtained by inputting a preset threshold recognition ratio to the updated artificial neural network.

Embodiment 7: In Embodiment 6, the method may further include the steps of receiving, from a network, downlink control information (DCI) used to schedule the transmission of the target gain and the recognition ratio information and transmitting the target gain and the recognition ratio information to the network based on the DCI.

Embodiment 8: In Embodiment 7, the method may further include the steps of performing an initial access procedure with the network based on a synchronization signal block (SSB) and transmitting the target gain and the recognition ratio information to the network through a PUSCH. The SSB and the DM-RS of the PUSCH are QCLed with respect to QCL type D.

Embodiment 9: In Embodiment 8, the method may further include the steps of controlling a communication unit to transmit the target gain and the recognition ratio information to an AI processor included in the network and controlling the communication unit to receive AI-processed information from the AI processor. The AI-processed information may include the threshold gain obtained by inputting the threshold recognition ratio to the artificial neural network included in the AI processor using the target gain and the recognition ratio information.

Embodiment 10: In Embodiment 9, the preset target gain is −15 dB.

Embodiment 11: a voice recognition device intelligently recognizing a voice includes at least one microphone configured to detect a signal and a processor configured to determine the size of a first voice signal if the first voice signal is recognized, adjust the size of a microphone detection signal based on the size of the first voice signal if the microphone detection signal is obtained through the at least one microphone after the first voice signal is recognized, and recognize a second voice signal in the adjusted microphone detection signal.

Embodiment 12: In Embodiment 11, the processor may be configured to determine whether the first voice signal is an activation speech for activating a voice recognition function of the voice recognition device and to determine the size of the first voice signal based on a result of the determination.

Embodiment 13: In Embodiment 12, the processor may be configured to determine the size of the first voice signal for each frame of the first voice signal and to adjust the size of the microphone detection signal for each frame of the microphone detection signal.

Embodiment 14: In Embodiment 13, the processor may be configured to determine an average gain of a first frame of the microphone detection signal, compare the average gain of the first frame with a preset target gain, and increase or decrease the gain of the first frame by the target gain based on a result of the comparison.

Embodiment 15: In Embodiment 14, the processor may be configured to update the target gain based on recognition ratio information of the recognized second voice signal.

Embodiment 16: In Embodiment 15, the processor may be configured to update a pre-trained artificial neural network using the target gain and the recognition ratio information and to update the target gain with a threshold gain obtained by inputting a preset threshold recognition ratio to the updated artificial neural network.

Embodiment 17: In Embodiment 16, the voice recognition device further includes a communication unit configured to transmit or receive data to or from a network. The processor may be configured to control the communication unit to receive, from the network, downlink control information (DCI) used to schedule the transmission of the target gain and the recognition ratio information and transmit the target gain and the recognition ratio information to the network based on the DCI.

Embodiment 18: In Embodiment 17, the processor may be configured to control the communication unit to perform an initial access procedure with the network based on a synchronization signal block (SSB) and to transmit the target gain and the recognition ratio information to the network through a PUSCH. The SSB and a DM-RS of the PUSCH may be QCLed with respect to QCL type D.

Embodiment 19: In Embodiment 18, the processor may be configured to control the communication unit to transmit the target gain and the recognition ratio information to an AI processor included in the network and to receive AI-processed information from the AI processor. The AI-processed information may include the threshold gain obtained by inputting the threshold recognition ratio to the artificial neural network included in the AI processor using the target gain and the recognition ratio information.

Embodiment 20: In Embodiment 19, the preset target gain is −15 dB.

Embodiment 21: a non-transitory computer-readable recording medium is a non-transitory computer-readable recording medium in which a computer-executable component configured to be executed in one or more processor of a computing device is stored. The computer-executable component may be configured to determine the size of a first voice signal if the first voice signal is recognized, adjust the size of a microphone detection signal based on the size of the first voice signal if the microphone detection signal is obtained through at least one microphone after the first voice signal is recognized, and recognize a second voice signal in the adjusted microphone detection signal.

The present invention may be implemented as a computer-readable code in a medium in which a program is written. The computer-readable medium includes all types of recording devices in which data readable by a computer system is stored. Examples of the computer-readable medium include a hard disk drive (HDD), a solid state disk (SSD), a silicon disk drive (SDD), ROM, RAM, CD-ROM, magnetic tapes, floppy disks, and optical data storages, and also include that the computer-readable medium is implemented in the form of carrier waves (e.g., transmission through the Internet). Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

The effects of the intelligent voice recognition method, voice recognition apparatus and intelligent computing device according to an embodiment of the present invention are as follows.

According to the present invention, a command included in a user's voice can be accurately recognized by automatically adjusting the size of an input signal for a subsequent spoken command based on the size of the input signal of an activation speech spoken by a user.

Furthermore, according to the present invention, the gain of a voice signal spoken by a user can be accurately adjusted in the environment in which various sounds are detected by a microphone.

Furthermore, according to the present invention, a phenomenon in which an SNR is reduced when an automatic gain control algorithm based on a voice probability is used can be prevented by adjusting only the gain of a voice signal while the SNR of a microphone detection signal is maintained.

Effects which can be achieved by the present invention are not limited to the above-mentioned effects. That is, other objects that are not mentioned may be obviously understood by those skilled in the art to which the present invention pertains from the following description.

What is claimed is:

1. A method of intelligently recognizing a voice by a voice recognition device, the method comprising:
   determining a size of a first voice signal if the first voice signal is recognized through the voice recognition device;
   adjusting a size of a microphone detection signal based on the size of the first voice signal to generate an adjusted microphone detection signal if the microphone detection signal is obtained through a microphone of the voice recognition device after the first voice signal is recognized; and
   recognizing a second voice signal in the adjusted microphone detection signal,
   wherein the determining the size of the first voice signal comprises:
      determining whether the first voice signal is an activation speech for activating a voice recognition function of the voice recognition device to generate a determination, and
      determining the size of the first voice signal based on a result of the determination,
   wherein the determining the size of the first voice signal further comprises determining the size of the first voice signal for each frame of the first voice signal,
   wherein the adjusting the size of the microphone detection signal comprises adjusting the size of the microphone detection signal for each frame of the microphone detection signal,
   wherein the adjusting the size of the microphone detection signal for each frame of the microphone detection signal comprises:
      determining an average gain of a first frame of the microphone detection signal,
      comparing the average gain of the first frame with a preset target gain, and
      increasing or decreasing a gain of the first frame by a target gain based on a result of the comparing,
   wherein the method further comprises:
   updating the target gain based on recognition ratio information of the recognized second voice signal, and
   wherein the updating the target gain comprises:
      updating a pre-trained artificial neural network using the target gain and the recognition ratio information, and
      updating the target gain with a threshold gain obtained by inputting a preset threshold recognition ratio to the updated artificial neural network.

2. The method of claim 1, further comprising:
   receiving, from a network, downlink control information (DCI) used to schedule a transmission of the target gain and the recognition ratio information, and
   transmitting the target gain and the recognition ratio information to the network based on the DCI.

3. The method of claim 2, further comprising:
   performing an initial access procedure with the network based on a synchronization signal block (SSB), and
   transmitting the target gain and the recognition ratio information to the network through a PUSCH,
   wherein the SSB and a DM-RS of the PUSCH are QCLed with respect to QCL type D.

4. The method of claim 3, further comprising:
   controlling a communication unit to transmit the target gain and the recognition ratio information to an artificial intelligence (AI) processor included in the network, and controlling the communication unit to receive AI-processed information from the AI processor,
wherein the AI-processed information comprises the threshold gain obtained by inputting the threshold recognition ratio to the artificial neural network included in the AI processor using the target gain and the recognition ratio information.

5. The method of claim 4,
wherein the preset target gain is −15 dB.

6. A voice recognition device for intelligently recognizing a voice, comprising:
at least one microphone configured to detect a signal; and
a processor configured to:
determine a size of a first voice signal if the first voice signal is recognized,
adjust a size of a microphone detection signal based on the size of the first voice signal to generate an adjusted microphone detection signal if the microphone detection signal is obtained through the at least one microphone after the first voice signal is recognized,
recognize a second voice signal in the adjusted microphone detection signal,
determine whether the first voice signal is an activation speech for activating a voice recognition function of the voice recognition device to generate a determination,
determine the size of the first voice signal based on a result of the determination,
determine the size of the first voice signal for each frame of the first voice signal,
adjust the size of the microphone detection signal for each frame of the microphone detection signal,
determine an average gain of a first frame of the microphone detection signal,
compare the average gain of the first frame with a preset target gain to generate a comparison,
increase or decrease a gain of the first frame by a target gain based on a result of the comparison,
update the target gain based on recognition ratio information of the recognized second voice signal,
update a pre-trained artificial neural network using the target gain and the recognition ratio information, and
update the target gain with a threshold gain obtained by inputting a preset threshold recognition ratio to the updated artificial neural network.

7. The voice recognition device of claim 6, further comprising:
a communication unit configured to transmit or receive data to or from a network,
wherein the processor is configured to control the communication unit to:
receive, from the network, downlink control information (DCI) used to schedule a transmission of the target gain and the recognition ratio information, and
transmit the target gain and the recognition ratio information to the network based on the DCI.

8. The voice recognition device of claim 7,
wherein the processor is configured to control the communication unit to:
perform an initial access procedure with the network based on a synchronization signal block (SSB), and
transmit the target gain and the recognition ratio information to the network through a PUSCH,
wherein the SSB and a DM-RS of the PUSCH are QCLed with respect to QCL type D.

9. The voice recognition device of claim 8,
wherein the processor is configured to control the communication unit to:
transmit the target gain and the recognition ratio information to an AI processor included in the network, and
receive AI-processed information from the AI processor,
wherein the AI-processed information comprises the threshold gain obtained by inputting the threshold recognition ratio to the artificial neural network included in the AI processor using the target gain and the recognition ratio information.

10. A non-transitory computer-readable recording medium in which a computer-executable component configured to be executed in one or more processor of a computing device is stored,
wherein the computer-executable component is configured to:
determine a size of a first voice signal if the first voice signal is recognized,
adjust a size of a microphone detection signal based on the size of the first voice signal to generate an adjusted microphone detection signal if the microphone detection signal is obtained through at least one microphone after the first voice signal is recognized, and
recognize a second voice signal in the adjusted microphone detection signal,
determine whether the first voice signal is an activation speech for activating a voice recognition function of the voice recognition device to generate a determination,
determine the size of the first voice signal based on a result of the determination,
determine the size of the first voice signal for each frame of the first voice signal, and
adjust the size of the microphone detection signal for each frame of the microphone detection signal,
determine an average gain of a first frame of the microphone detection signal,
compare the average gain of the first frame with a preset target gain to generate a comparison,
increase or decrease a gain of the first frame by a target gain based on a result of the comparison,
update the target gain based on recognition ratio information of the recognized second voice signal,
update a pre-trained artificial neural network using the target gain and the recognition ratio information, and
update the target gain with a threshold gain obtained by inputting a preset threshold recognition ratio to the updated artificial neural network.

* * * * *